(12) United States Patent
Redman

(10) Patent No.: US 11,230,442 B2
(45) Date of Patent: Jan. 25, 2022

(54) PALLET EXCHANGER AND LOAD SPLITTER

(71) Applicant: Paul Redman, London (CA)

(72) Inventor: Paul Redman, London (CA)

( * ) Notice: Subject to any disclaimer, the term of this patent is extended or adjusted under 35 U.S.C. 154(b) by 0 days.

(21) Appl. No.: 16/662,770

(22) Filed: Oct. 24, 2019

(65) Prior Publication Data

US 2020/0130956 A1 Apr. 30, 2020

(30) Foreign Application Priority Data

Oct. 24, 2018 (CA) .................................. CA 3021982

(51) Int. Cl.
  *B65G 59/02* (2006.01)
  *B65G 47/91* (2006.01)

(52) U.S. Cl.
  CPC ......... *B65G 47/912* (2013.01); *B65G 47/917* (2013.01); *B65G 47/918* (2013.01); *B65G 59/02* (2013.01)

(58) Field of Classification Search
  CPC .. B65G 47/912; B65G 47/917; B65G 47/918; B65G 59/02; B65G 59/063; B65G 57/301
  USPC ................ 414/795.7, 795.9, 796, 796.2, 799
  See application file for complete search history.

(56) References Cited

U.S. PATENT DOCUMENTS

| | | | |
|---|---|---|---|
| 3,160,292 A | 12/1964 | Albrecht | |
| 3,273,751 A | 9/1966 | De Wees | |
| 3,523,617 A | 11/1970 | Raynor et al. | |
| 3,623,618 A | 11/1971 | Shaw | |
| 3,757,971 A | 9/1973 | Frish | |
| 3,765,546 A | 10/1973 | Westerling | |
| 3,866,780 A | 2/1975 | Miller et al. | |
| 3,917,082 A * | 11/1975 | Howard ............... | B65G 59/026 414/796.4 |
| 3,929,366 A | 12/1975 | Keverline | |
| 4,256,095 A | 3/1981 | Graham | |
| 4,400,601 A * | 8/1983 | Brucken ............... | H01H 35/24 200/81.4 |

(Continued)

FOREIGN PATENT DOCUMENTS

| CA | 2215759 A1 | 3/1999 |
|---|---|---|
| EP | 0361696 | 4/1990 |

(Continued)

OTHER PUBLICATIONS

Extended European Search Report for EP13850759.5; dated May 31, 2016.

(Continued)

*Primary Examiner* — Lynn E Schwenning
(74) *Attorney, Agent, or Firm* — Tarolli, Sundheim, Covell & Tummino LLP

(57) ABSTRACT

A pallet exchanger and load splitter apparatus and method are provided. The apparatus has a pallet-receiving assembly with a pallet-receiving zone configured to receive, at least in part, a pallet supporting a pallet load; a clamp assembly connected to the pallet-receiving assembly having a clamping zone configured to secure a first side, a second side, and a rear of the pallet load once the clamp assembly is activated by a pneumatic circuit so that the pallet load is supported by the clamp assembly; and the pneumatic circuit is for controlling a clamping pressure of the clamp assembly.

17 Claims, 18 Drawing Sheets

(56) References Cited

U.S. PATENT DOCUMENTS

| | | | |
|---|---|---|---|
| 4,493,599 A * | 1/1985 | Hartness | B65G 59/005 |
| | | | 294/87.1 |
| 4,624,616 A | 11/1986 | Freese | |
| 4,701,092 A | 10/1987 | Reynaud et al. | |
| 4,960,362 A | 10/1990 | Karpisek | |
| 4,964,782 A | 10/1990 | DeCrane | |
| 5,020,966 A | 6/1991 | Kiker | |
| 5,033,935 A | 7/1991 | DeCrane | |
| 5,102,282 A | 4/1992 | Maddox | |
| 5,276,957 A | 1/1994 | Murphy et al. | |
| 5,451,136 A | 9/1995 | Easton | |
| 5,480,280 A | 1/1996 | Bordon | |
| 5,567,102 A | 10/1996 | Tanaka | |
| 5,575,613 A | 11/1996 | Lierop | |
| 5,607,282 A * | 3/1997 | Brannen | B65G 59/00 |
| | | | 414/796.3 |
| 5,785,482 A | 7/1998 | Tanaka | |
| 5,951,238 A | 9/1999 | Duecker | |
| 6,045,324 A | 4/2000 | Redman | |
| 6,139,254 A * | 10/2000 | Ouellette | B65G 59/063 |
| | | | 198/345.1 |
| 6,247,887 B1 | 6/2001 | Springston et al. | |
| 6,422,806 B1 | 7/2002 | Jenkins et al. | |
| 6,632,067 B1 | 10/2003 | Ouellette | |
| 6,871,618 B2 | 3/2005 | Masse | |
| 7,673,743 B2 | 3/2010 | Ruff et al. | |
| 8,267,637 B2 | 9/2012 | Ouellette et al. | |
| 9,181,047 B2 | 11/2015 | Redman | |
| 9,260,256 B2 * | 2/2016 | Christensen | B65G 47/91 |
| 9,527,178 B2 * | 12/2016 | Susnjara | B27M 1/08 |
| 9,718,628 B2 * | 8/2017 | Redman | B65G 1/00 |
| 10,035,666 B2 * | 7/2018 | Redman | B65G 60/00 |
| 10,046,926 B2 | 8/2018 | Redman | |
| 2002/0160070 A1 * | 10/2002 | Kitayama | B29C 45/67 |
| | | | 425/150 |
| 2004/0146390 A1 | 7/2004 | Lancaster et al. | |
| 2010/0119348 A1 | 5/2010 | Snapp | |
| 2010/0124476 A1 | 5/2010 | Berlinger | |
| 2010/0300812 A1 | 12/2010 | Hall et al. | |
| 2017/0233199 A1 * | 8/2017 | King | B65G 57/303 |
| | | | 414/789.7 |
| 2019/0297840 A1 * | 10/2019 | Coulter | A61D 3/00 |

FOREIGN PATENT DOCUMENTS

| | | |
|---|---|---|
| EP | 0219780 B1 | 3/1991 |
| EP | 0927136 A1 | 7/1999 |
| EP | 1369361 B1 | 1/2005 |
| FR | 2849648 A1 | 7/2004 |
| GB | 957236 | 5/1964 |
| GB | 1201836 A | 8/1970 |
| JP | S5398681 | 8/1978 |
| JP | S516165628 | 12/1981 |
| JP | 58100024 | 6/1983 |
| JP | 10226424 A | 8/1998 |
| JP | 2000053228 A | 2/2000 |
| JP | 2000233828 A | 8/2000 |
| JP | 2005001750 A | 1/2005 |
| JP | 2008303020 A | 12/2008 |
| TW | M440301 U | 11/2012 |
| WO | 9809898 A1 | 3/1998 |
| WO | 0026127 | 5/2000 |
| WO | 2010057898 A1 | 5/2010 |
| WO | 2014067014 | 5/2014 |
| WO | 2014111890 | 7/2014 |

OTHER PUBLICATIONS http://dhgroup.dk/; retrieved on May 30, 2014.
http://www.eqm.co.nz/shop/New+Product+Range/Materials+Handling/EQM+Pallet+Dispensers.html; retrieved on May 30, 2014.
http://www.palletdispenser.com/?gclid=COLojczZqbcCFYU-Mgod7gQAiw; retrieved on May 30, 2014.
http://www.palletizing.com/products/accessories/pallet-dispensers; retrieved on May 30, 2014.
http://www.palomat.com/palletmagazine/stand-alone.aspx>; retrieved on May 30, 2014.
International Search Report and Written Opinion; corresponding international application No. PCT/CA2013/050835 dated Feb. 5, 2014.
International Search Report and Written Opinion; corresponding international application No. PCT/IB2014/059533; dated Jun. 13, 2014.
International Search Report and Written Opinion; corresponding international application No. PCT/IB2015/055293; dated Oct. 30, 2015.
Name: "QTek Bomber" Link: https://youtu.be/VnsYoEBbXcA Date posted: May 30, 2012 Date retrieved Jan. 21, 2021.

* cited by examiner

PALLET EXCHANGER AND LOAD SPLITTER

CROSS-REFERENCE TO RELATED APPLICATION

This application claims priority to Canadian Patent Application No. 3,021,982, filed on Oct. 24, 2018, the disclosure of which is incorporated herein by reference in its entirety.

TECHNICAL FIELD

Aspects generally relate to apparatus and method for exchanging pallets and splitting pallet loads.

BACKGROUND

Replacing or exchanging pallets from a stack of products such as cases of beer, cans, crated produce, and other such items is a common occurrence during the manufacturing, distribution, and shipment of goods. For example, a manufacturing facility using plastic pallets to stack finished product may wish to transfer the product to more economical wooden pallets prior to shipping. Likewise, a production facility receiving product, such as fresh produce, shipped on a wooden pallet may want to transfer the product to more hygienic plastic or metal pallets prior to introducing the product into the production facility.

Replacing pallets from a stack of products can be performed manually by re-stacking the product on to another pallet. This procedure, however is time consuming and ergonomically inefficient and difficult.

An example apparatus that may be used to exchange pallets is disclosed in U.S. Pat. No. 6,045,324 Stacking Clamp (Redman). This apparatus is configured to stack selected layers of product on a pallet by placing a load in the apparatus using a forklift truck, clamping the selected layers of product, removing the remaining pallet load, then placing a successive pallet load of different product in the apparatus and raising the pallet load to the lowermost surface of the previous clamped layer which is then released. A skilled person would understand that the entire load could be clamped allowing for the pallet to be replaced using a forklift truck.

In another example apparatus, a stationary pallet exchanger as disclosed by Baust Materialflusssysteme's Pallet Exchanger PW 500 holds the product in place using a side clamping mechanism so that the pallet can be exchanged using a hand-operated pallet jack.

Problems associated with the above apparatuses include, e.g. cost, complexity, ability to handle a tall load, and/or, inability to handle loads of different configurations.

SUMMARY

In an embodiment an apparatus for exchanging pallets is provided. The apparatus has a pallet-receiving assembly having a pallet-receiving zone configured to receive, at least in part, a pallet supporting a pallet load. A clamp assembly is connected to the pallet-receiving assembly. The clamp assembly has a clamping zone configured to secure a first side, a second side, and a rear of the pallet load once the clamp assembly is activated so that the pallet load is supported, at least in part, by the clamp assembly.

In another embodiment the yaw of the pressure plate of the clamp assembly can be adjusted to support irregularly sized pallet loads once the clamp assembly is activated.

In another embodiment the apparatus includes a load sensor. The load sensor detects when a load is insecure once the clamp assembly is activated.

In another embodiment the apparatus is elevated from a work surface.

In another embodiment the apparatus has a first-side clamping mechanism attached to a first side of a frame, the first-side clamping mechanism configured to move inwardly towards a clamping-zone once the first-side clamping mechanism is activated. And, a second-side clamping mechanism attached to a second side of the frame, the second-side clamping mechanism configured to move inwardly towards the clamping-zone once the second-side clamping mechanism is activated. Wherein, the first-side clamping mechanism, the second-side clamping mechanism, or both adjusts a yaw angle to match a shape of a pallet load once the first-side clamping mechanism, the second-side clamping mechanism, or both are activated.

In another embodiment a method is provided. The method includes moving a pallet having a pallet load into a pallet-receiving zone. Once the pallet is in the pallet-receiving zone the pallet having the pallet load is then raised so that the pallet load is, at least in part, in a clamping zone. The operator then activates a clamp assembly so that the pallet load is supported, at least in part, by the clamp assembly. The operator then lowers the pallet from the pallet load. Once the pallet has been lowered, the operator then removes the pallet from the pallet-receiving zone. The operator then moves a different pallet into the pallet-receiving zone. The operator then raises the pallet to the pallet load and deactivates the clamp assembly so that the pallet load is supported by the different pallet. Finally, the operator removes the different pallet supporting the pallet load from the pallet-receiving zone. In this embodiment the clamp assembly is configured to adjust a yaw to secure an irregularly shaped pallet load.

Figure 1:
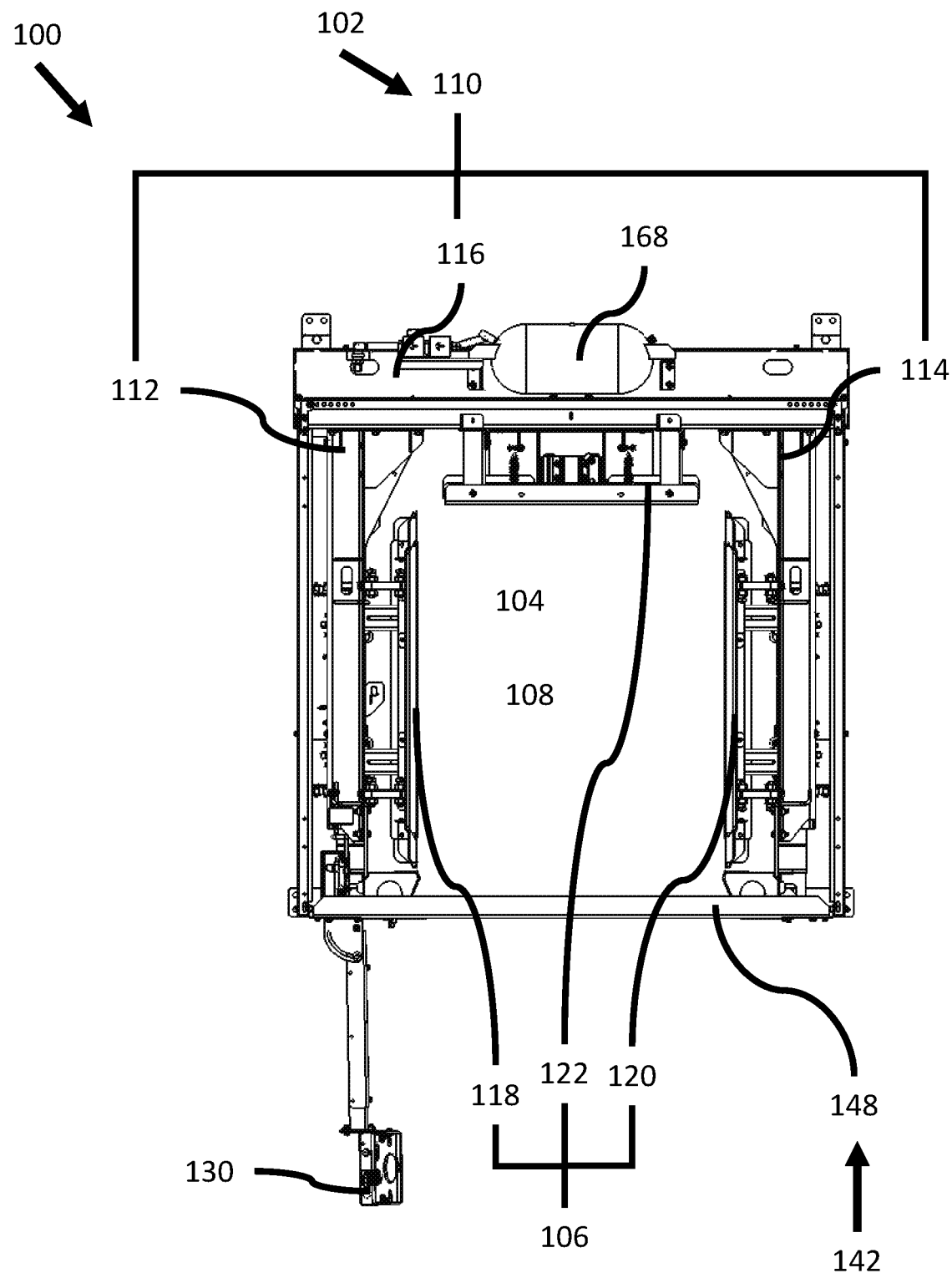
FIG. 1 depicts a top down view of an embodiment of the apparatus.

LISTING OF REFERENCE NUMERALS USED
IN THE DRAWINGS

100 apparatus
102 pallet-receiving assembly
104 pallet-receiving zone
106 clamp assembly
108 clamping-zone
110 frame
112 first side
114 second side
116 rear
118 first-side clamping mechanism
120 second-side clamping mechanism
122 rear-clamping mechanism
124 pallet load
126 work surface
128 improperly secured load detector
130 signal light
132 pivot
140 pallet
142 height limiting apparatus
144 photoeye
146 risers
148 bar
150 post
152 support member
154 slot
155 cam follower
156 cam follower unit
157 link plate
158 movable arms
160 arm
162 extension assembly
164 airbag
166 pressure plate
168 compressed air source
170 front assembly
172 rear assembly
174 rear bumper
176 yaw
178 air pressure selector switch
180 clamp on/off switch

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

An embodiment of the apparatus 100 is depicted in the sequence of figures labelled FIG. 1-FIG. 5. The apparatus 100 allows for the replacement of a pallet supporting a pallet load by temporarily supporting the pallet load by clamping the pallet load, thereby allowing the pallet to be removed from the pallet-receiving zone (104) and then replaced with a different pallet.

Figure 2:
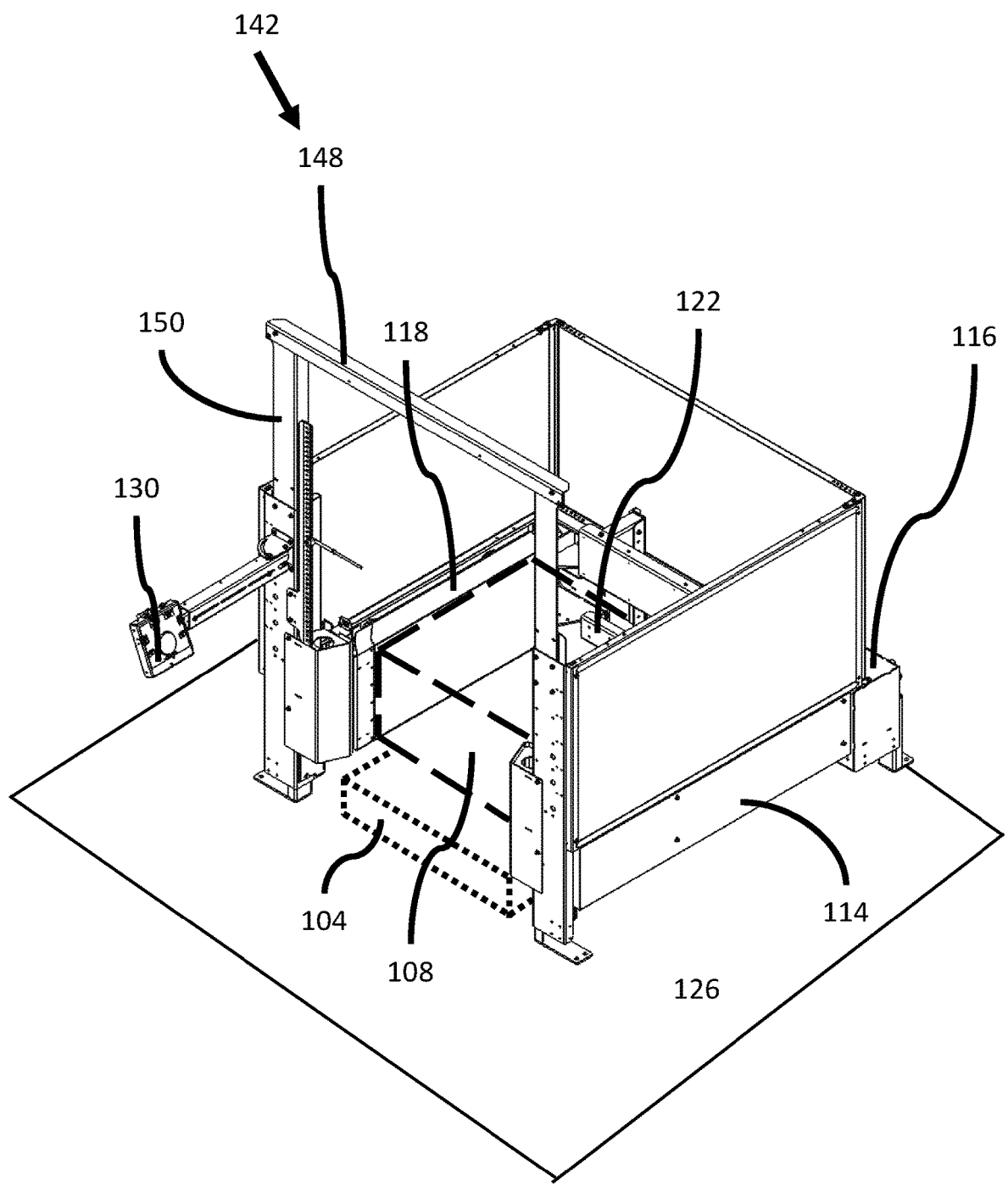
FIG. 2 depicts a perspective view of the embodiment of FIG. 1.
Figure 3A:
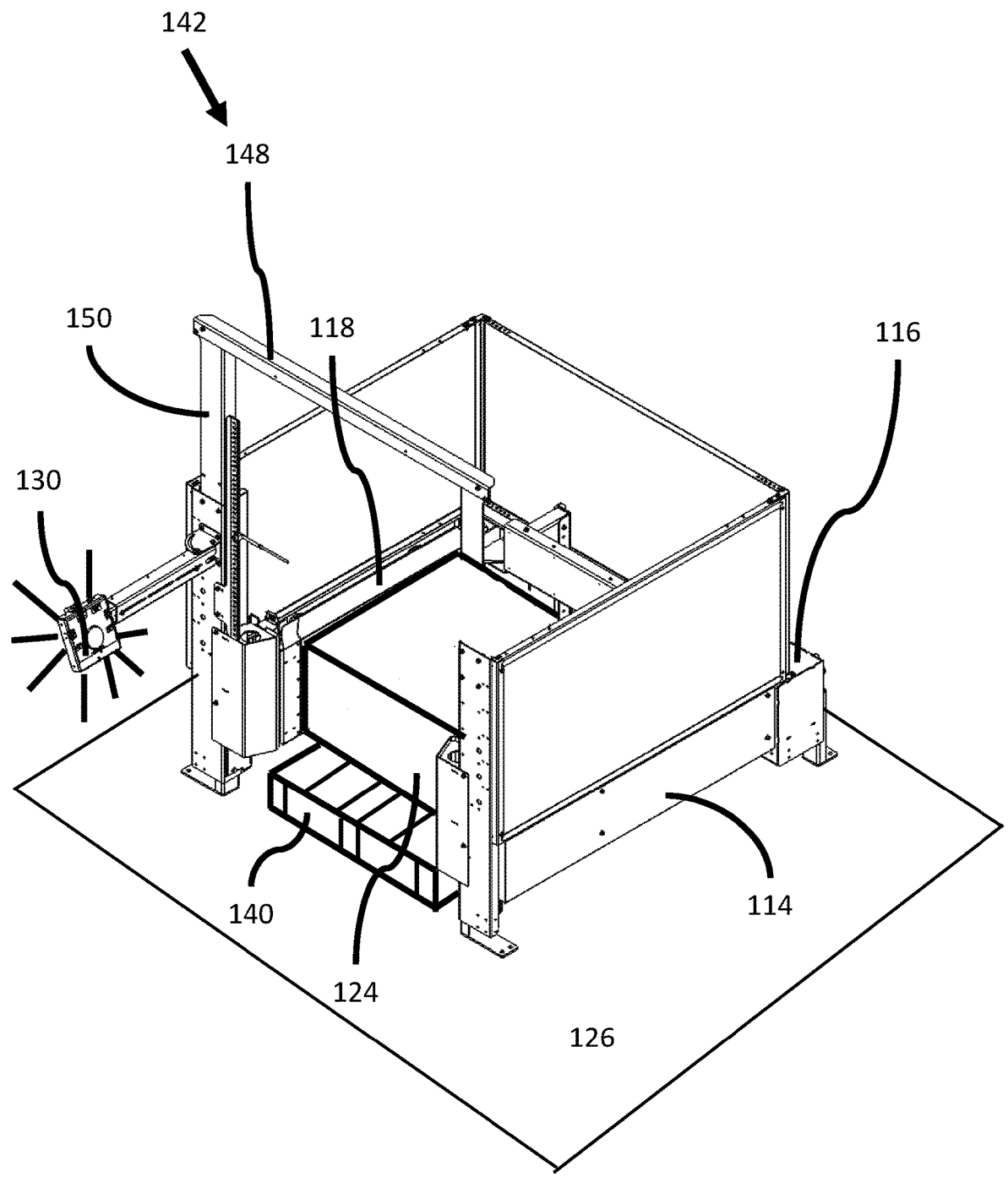
FIG. 3A depicts a perspective view of the embodiment of FIG. 1, the apparatus having a pallet and pallet load.
Figure 3B:
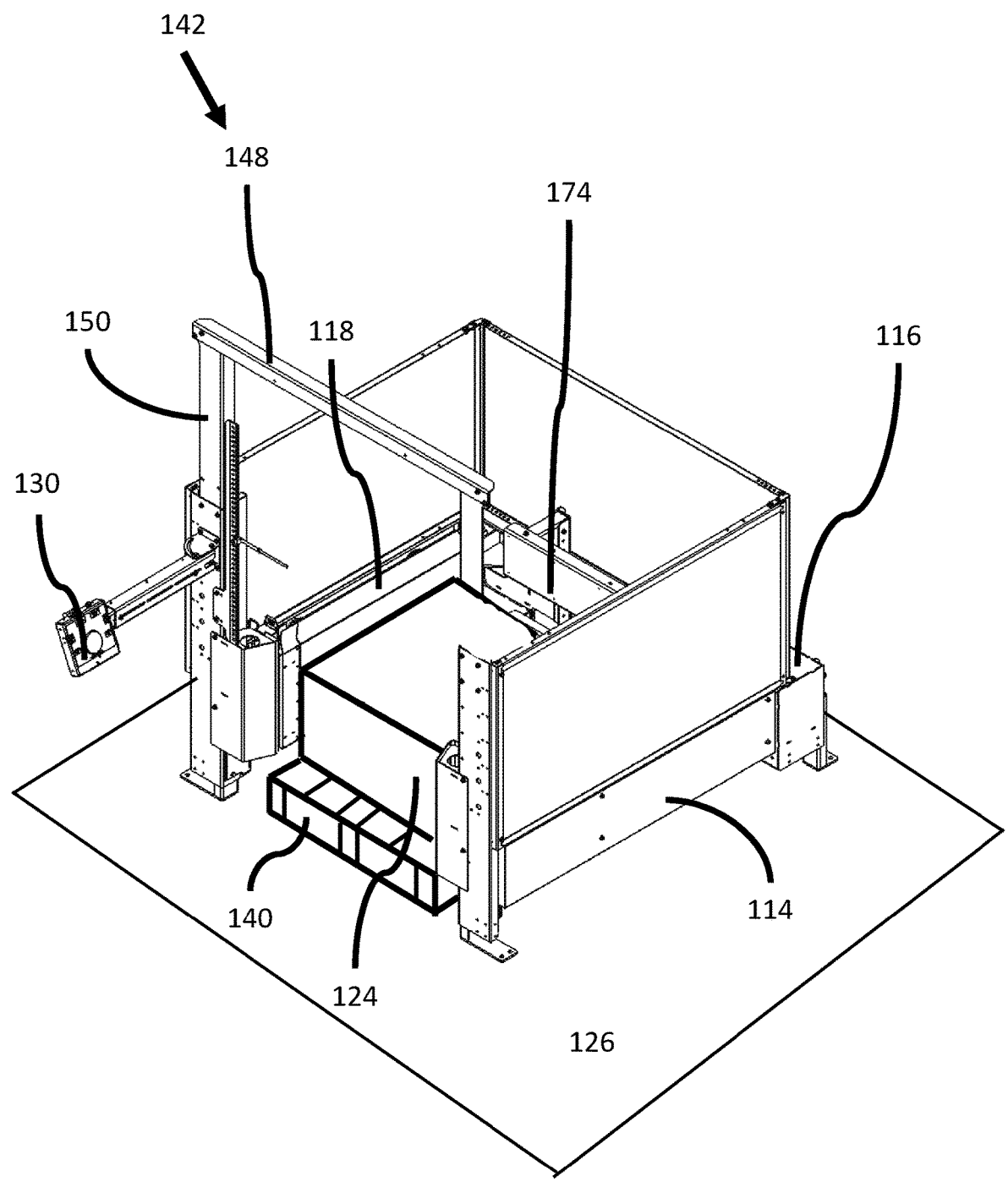
FIG. 3B depicts a perspective view of the embodiment of FIG. 1, the apparatus having a pallet and an insecure pallet load.
Figure 4:
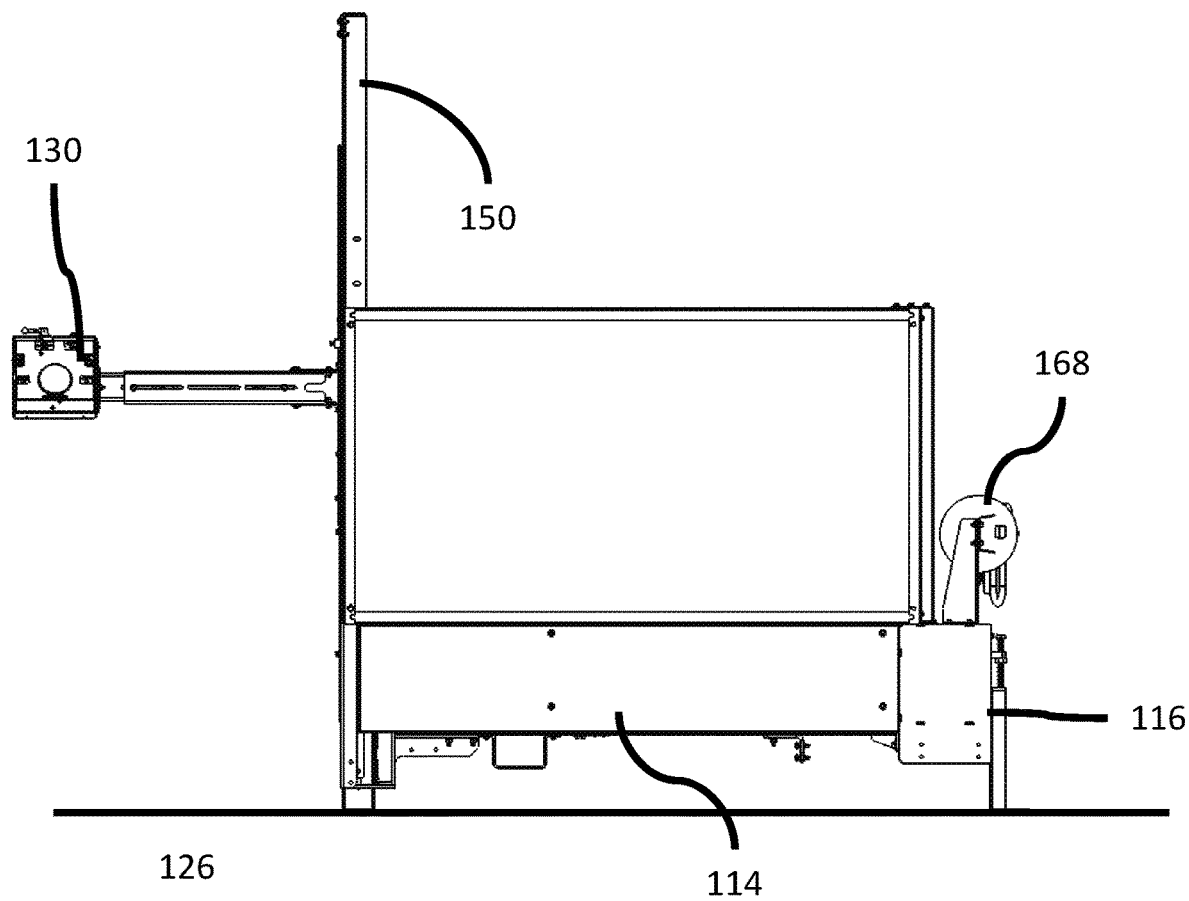
FIG. 4 depicts a side view of the apparatus of FIG. 1.
Figure 5:
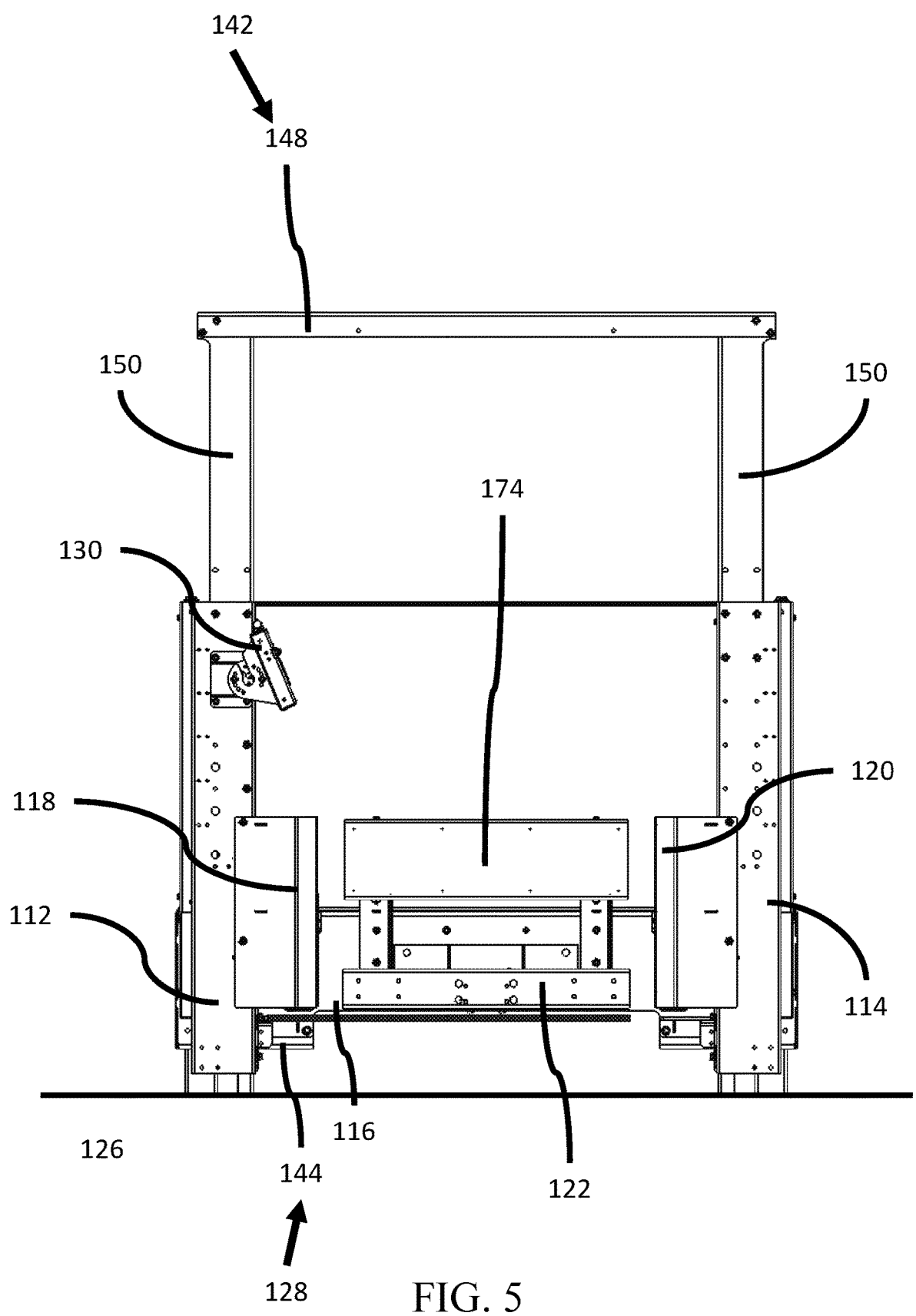
FIG. 5 depicts a front view of the apparatus of FIG. 1.

Referring now to FIG. 1 to FIG. 5, these figures depict different views of an embodiment. FIG. 1 depicts a top down view of an embodiment of the apparatus 100. FIG. 2 depicts a perspective view of the apparatus 100 of FIG. 1. FIG. 3A depicts a perspective view of the apparatus 100 of FIG. 1 with the apparatus 100 having a pallet 140 and pallet load 124. FIG. 4 depicts a side view of the apparatus 100 of FIG. 1. FIG. 5 depicts a front view of the apparatus 100 of FIG. 1.

The apparatus 100 has a pallet-receiving assembly 102 having a pallet-receiving zone 104. The pallet-receiving zone 104 is configured to receive, at least in part, a pallet (FIG. 3A 140) supporting a pallet load (FIG. 3A 124).

The apparatus 100 also has a clamp assembly 106. The clamp assembly 106 has a clamping zone 108. The clamp assembly 106 has an activated state (wherein the clamp assembly 106 is said to be activated) and a deactivated state (wherein the clamp assembly 106 is said to be deactivated). When the clamping assembly 106 is activated, the clamping assembly 106 is configured to secure a pallet load (FIG. 3A 124) in the clamping zone 108.

In this embodiment, and as shown in FIG. 2 and FIG. 3A, the clamping zone 108 is positioned above the pallet-receiving zone 104 so that once the clamp assembly 106 is activated, only the pallet load (FIG. 3A 124) is secured by the clamp assembly 106 and the pallet 140 is not secured. In the embodiment where the apparatus 100 is positioned on a work surface 126, the clamping zone 108 is configured so that a bottom of the clamping zone 108 (and also the bottom of the clamp assembly 106) engages, at least in part, a bottom layer (not shown) of the pallet load (FIG. 3A 124).

Furthermore, in the embodiment where the apparatus 100 is positioned on a work surface 106 the pallet-receiving zone 104 should be sufficiently sized to allow for a pallet to be freely removed and replaced by a pallet transporter (not shown) once the clamp assembly 106 is activated and has engaged the pallet load (FIG. 3A 124). In some instances this will require that the pallet transporter (not shown) slightly raise or lower the pallet (FIG. 3A 140) (and the corresponding pallet load FIG. 3A 124) to position the pallet load (FIG. 3A 124) in the clamping zone 108 and to separate the pallet (FIG. 3A 140) from the pallet load (FIG. 3A 124) once the clamp assembly 106 is activated.

For instance, in an example where the pallet is a standard CHEP wood block pallet, the dimensions of the pallet-receiving zone 104 defined by the pallet-receiving assembly 102 would be larger than the standard CHEP pallet itself. In an embodiment, the vertical dimension of the pallet-receiving zone 104 would be taller than the pallet (FIG. 3A 140) so that the pallet transporter can move the pallet (FIG. 3A 140) and corresponding pallet load (FIG. 3A 124) vertically towards the clamping zone 108. Furthermore, in some embodiments it may be beneficial for the horizontal and/or depth dimensions of the pallet-receiving zone 104 to be larger than the pallet (FIG. 3A 140) so that the pallet (FIG. 3A 140) can be moved freely once the clamp assembly 106 is activated and has secured the pallet load (FIG. 3A 124).

In this embodiment the clamp assembly 106, once activated, is configured to secure a first side, a second side, and a rear of the pallet load (FIG. 3A 124) in the clamping zone 108. In this embodiment the second side of the pallet load (FIG. 3A 124) is substantially parallel to and separated from the first side of the pallet load (FIG. 3A 124). That is, the first side of the pallet load (FIG. 3A 124) is the opposite side of the second side of the pallet load (FIG. 3A 124).

In this embodiment once the clamp assembly 106 is activated the clamping assembly 106 moves inwards towards the clamping zone 108.

Once the clamp assembly 106 is activated and the pallet load (FIG. 3A 124) is secured the pallet (FIG. 3A 140) can be separated from the pallet load (FIG. 3A 124). This is because the pallet load (FIG. 3A 124) is no longer supported by the pallet (FIG. 3A 140) but by the clamp assembly 106. That is, the pallet load 124 is supported by the clamp assembly 106.

Once the pallet load (FIG. 3A 124) is secured the pallet can then be removed from the pallet-receiving zone (104). That is, once the pallet (FIG. 3A 140) has been separated from the pallet load (FIG. 3A 124) the pallet (FIG. 3A 140) can be removed from the apparatus 100 and replaced. In this embodiment the pallet transporter would separate the pallet (FIG. 3A 140) from the pallet load (FIG. 3A 124) by lowering the pallet (FIG. 3A 140) from the now secured pallet load (FIG. 3A 124), thereby creating a vertical separation between the pallet (FIG. 3A 140) and the pallet load (FIG. 3A 124)

A different pallet (not shown) can then be moved into the pallet-receiving zone 104. The different pallet (not shown) is then positioned relative to the pallet load (FIG. 3A 124) so that once the clamp assembly 106 is deactivated the pallet load (FIG. 3A 124) is supported by the different pallet (not shown).

Referring again to FIG. 1, the pallet receiving assembly 102 has a frame 110. The frame defines the pallet receiving zone 104. The pallet receiving zone 104 is sized so that a pallet 140 can be freely moved into and out of the pallet receiving zone 104. For instance, in some embodiments the pallet receiving zone is sized so that standardized pallets (such as CHEP pooled wood block pallets) can be freely moved into and out of the pallet receiving zone 104. It will be appreciated that the size of the pallet-receiving zone 104 and the frame 110 will depend on the size of the pallet being used.

In this embodiment, the frame 110 has a first side 112, a second side 114 substantially parallel and separated from the first side 110, and a rear 116 connecting the first side and the second side so that the first side 112 is substantially parallel to the second side 114 and that the first side 112 and second side 114 are substantially perpendicular to the rear 116.

In this embodiment the frame 110 forms a partially open enclosure that defines the pallet receiving zone 104. Since the frame is partially open, a pallet 140 and its corresponding pallet load 124 (if the pallet 140 is supporting a pallet load 124) can be freely moved into and out of the pallet receiving zone 104 (when the clamp assembly 106 is deactivated).

It will be appreciated that, in this embodiment, the first side 112, the second side 114, and the rear 116 can be connected using any number or combination of known techniques without departing from the scope of this disclosure. For example, in some embodiments the first side 112, second side 114, and rear 116 can be connected using nuts and bolts, welds, screws, locking pins, friction fit, rivets, etc.

Referring again to FIG. 1, in the shown embodiment, the apparatus 100 also has a clamp assembly 106. The clamp assembly 106 has a first-side clamping mechanism 118 that is attached to the first side 112 of the frame 110. The clamp assembly 106 also has a second-side clamping mechanism 120 that is attached to the second side 114 of the frame 110. The clamp assembly 106 also has a rear-clamping mechanism 122 that is attached to the rear 116 of the frame 110.

It will be appreciated that the first-side clamping mechanism 118, the second-side clamping mechanism 120, and the rear-clamping mechanism 122 can be attached to the first-side 112, second side 114, and rear 116 using any known or combination of known techniques without departing from the scope of this disclosure. For example, in some embodiments the respective clamping mechanisms can be connected using nuts and bolts, welds, screws, locking pins, friction fit, rivets, etc.

Each of the respective clamping mechanisms are configured to move inwardly towards the clamping zone 108 once activated and to move outwardly away from the clamping zone 108 once deactivated. That is, the first-side clamping mechanism 118 is configured to move inwardly towards the clamping-zone 108 once the first-side clamping mechanism 118 is activated. Similarly, the second-side clamping mechanism 120 is configured to move inwardly towards the clamping-zone 108 once the second-side clamping mechanism 120 is activated. Finally, the rear clamping mechanism 122 is configured to move inwardly towards the clamping-zone 108 once the rear clamping mechanism 122 is activated.

Once each of the first-side clamping mechanism 112, second-side clamping mechanism 114, and rear-clamping mechanism 122 are activated the first-side clamping mechanism 118, second-side clamping mechanism 120, and rear-clamping mechanism 122 secures, at least in part, the pallet load (FIG. 3 124) so that the pallet (FIG. 3 140) does not support the pallet load (FIG. 3 124).

For example, in the embodiment depicted in FIG. 1-FIG. 6 once activated each of the first-side clamping mechanism 118, the second-side clamping mechanism 120, and rear-clamping mechanism 122 move inwards towards the clamping-zone 108 until the first side clamping mechanism 118, the second-side clamping mechanism 120, and rear-clamping mechanism 122 contacts the first-side (at least in part), second-side (at least in part), and rear (at least in part) of the pallet load (FIG. 3A 124) respectively.

Once the clamp mechanism 106 is deactivated the first-side clamping mechanism 118, second-side clamping mechanism 120, and rear clamping mechanism 122 move outwardly away from the clamping-zone 108 so that a pallet 140 having a pallet load 124 can be moved into and out of the pallet-receiving zone 104.

In the embodiment depicted in FIG. 1-FIG. 6B the apparatus 100 further includes a rear bumper 174. The rear bumper 174 is configured to contact the pallet load 124 when the pallet load 124 is moved into the pallet-receiving zone 104 (and clamping zone 108). This prevents the pallet load 124 from becoming misaligned when being moved into the pallet-receiving zone 104 (and clamping zone 108). The rear bumper 174 can also serve to alert the operator to when the pallet load 124 is in the pallet-receiving zone 104 (and clamping zone 108).

It will be appreciated that the pallet load (FIG. 3A 124) typically consists of several layers of product stacked on top of the pallet (FIG. 3 140). The product is typically arranged on the pallet (FIG. 3A 140) so that the width and the depth of the layers of product (and the pallet load FIG. 3A 124) does not exceed the width and depth of the pallet (FIG. 3A 140). In many cases the layers of product are arranged so that the width and depth of the product (and the pallet load FIG. 3 124) closely matches the width and depth of the pallet (FIG. 3A 140).

In contrast, the height of the pallet load (FIG. 3A 124) can be arbitrarily high. In the interests of safety, however, the height of the pallet load (FIG. 3A 124) will typically not exceed several feet (approximately 6 or 7 feet), depending on the product being placed on the pallet (FIG. 3A 140). In some instances several layers of product will be stacked on the pallet (FIG. 3A 140) until a safe and manageable height for the pallet load (FIG. 3A 124) is achieved.

In the embodiment depicted in FIG. 1-FIG. 6, a height limiting apparatus 142 is attached to the first side 112 and the second side 114 of the frame 110, opposite the rear 116, and near the front of the pallet-receiving zone 104 and the clamping-zone 108. The height limiting apparatus 142 is configured to prevent the apparatus 100 from being used if the pallet load (FIG. 3A 124) exceeds an arbitrary height. In this embodiment if a pallet load (FIG. 3A 124) exceeds the maximum safe height for the apparatus 100, the pallet load (FIG. 3A 124) will be blocked from entering the pallet receiving zone 104 and the clamping zone 108.

In this embodiment the height limiting apparatus 142 is a bar 148 that spans the first side 112 and the second side 114. The bar 148 is attached to posts 150 that extend vertically from each of the first side 112 and the second side 114. The maximum allowable height of the pallet load (FIG. 3A 124) is limited by the height of the 150 posts and the placement of the bar 148 on those posts 150. In some embodiments the bar 148 is positionable on the posts 150 so that different maximum pallet load heights can be moved into and out of the pallet-receiving zone 104. In other embodiments the bar 148 is removable so that an exceptionally tall pallet load can be moved into and out of the pallet-receiving zone 104.

In the embodiment depicted in FIG. 1-FIG. 6, the first-side clamping mechanism 118 and the second-side clamping mechanism 120 are configured so that, once activated, the first-side clamping mechanism 118 and the second-side clamping mechanism 120 secures at least several layers of product of the pallet load (FIG. 3A 124), including a bottom layer of product.

In the example depicted in FIG. 3, a shorter pallet load (FIG. 3A 124) is depicted. In this example the entirety of the first-side and the second-side of the load is secured. When a taller pallet load is used the first-side clamping mechanism 118 and second-side clamping mechanism 120 may not secure the entirety of the first-side and second-side of the pallet load (FIG. 3A 124). That is, the first-side clamping mechanism 118 and second-side clamping mechanism 120 will only secure a portion of the pallet load (FIG. 3A 124) approximately equal to the height of the pressure plate 166 of the first-side clamping mechanism 118 and the pressure plate 166 of the second-side clamping mechanism 120. This portion of the pallet load (FIG. 3A 124) corresponds to several layers of product including a bottom layer of product. The remainder of the product not secured by the first-side clamping mechanism 118 and second-side clamping mechanism 120 is then supported by the portion of the product secured by the first-side clamping mechanism 118 and second-side clamping mechanism 120. The pressure plate 166 may have a rubber coating or rubber belt on the surface for increased contact friction with the pallet load 124. In an embodiment, the pressure plate 166 for the first-side clamping mechanism 118 and the second-side clamping mechanism 120 ranges from about 15 to 30 inches high. In another embodiment, the pressure plate 166 for the first-side clamping mechanism 118 and the second side clamping mechanism 120 is 20 inches high. This height allows for more vertical gripping of the pallet load 124 when clamping products. For clamping product load 124 on the low pressure setting, the force is spread out and helps to reduce product damage. The pallet load 124 may comprise both hard and soft products to be clamped.

In the embodiment depicted in FIG. 1-FIG. 6, the rear clamping mechanism 122 is configured so that the rear clamping mechanism 122 secures one or more lower layers of product including the bottom layer of product of the rear of the pallet load (FIG. 3A 124). Furthermore, in this embodiment the height of the rear clamping mechanism 122 is shorter than the height of the first-side clamping mechanism 118 and/or the second-side clamping mechanism 120. That is, the rear clamping mechanism 122 is configured to contact fewer layers of product than the first-side clamping mechanism 118 and/or the second-side clamping mechanism 120. Preferably, the rear clamping mechanism 122 secures only one layer of the pallet load 124. In an embodiment, the bottom layer of the pallet load 124 is clamped for exchanging the pallet 140. In another embodiment, a layer above the bottom layer of the pallet load 124, or any layer except the bottom layer of the pallet load 124 is clamped for splitting the pallet load 124. In another embodiment, clamping a layer of the pallet load 124 allows for combining the clamped portion of the pallet load 124 with another pallet load on another pallet. Pallet loads 124 are commonly comprised of product with a minimum height of about 5 to 10 inches. In an embodiment, the rear clamping mechanism 122 has a height of about 4 inches. That is, the pressure plate 166 of the rear clamping mechanism 122 has a height of about 4 inches.

Figure 6A:
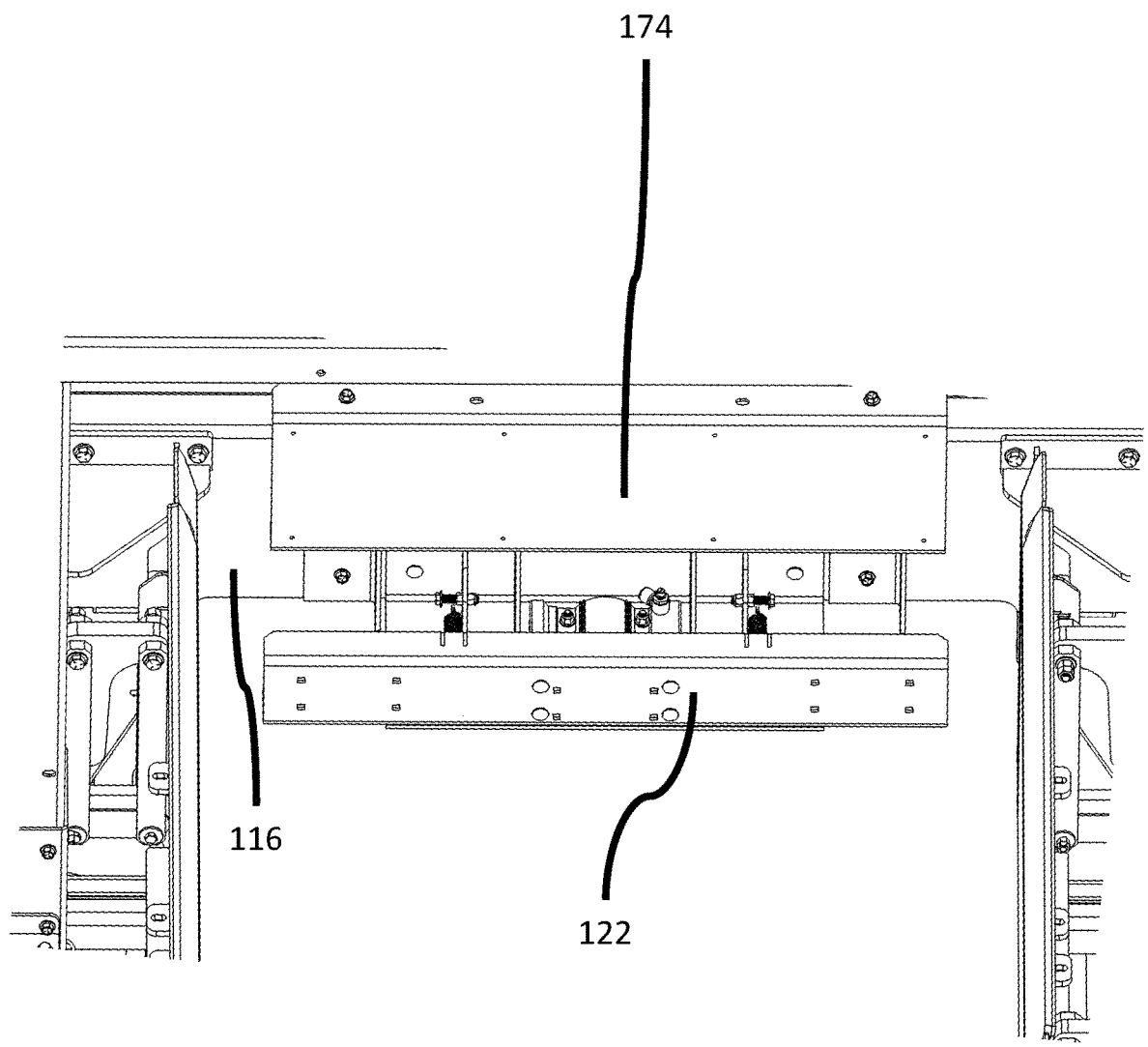
FIG. 6A depicts a partial top down view of the rear clamp and the rear bumper of an embodiment apparatus.
Figure 6B:
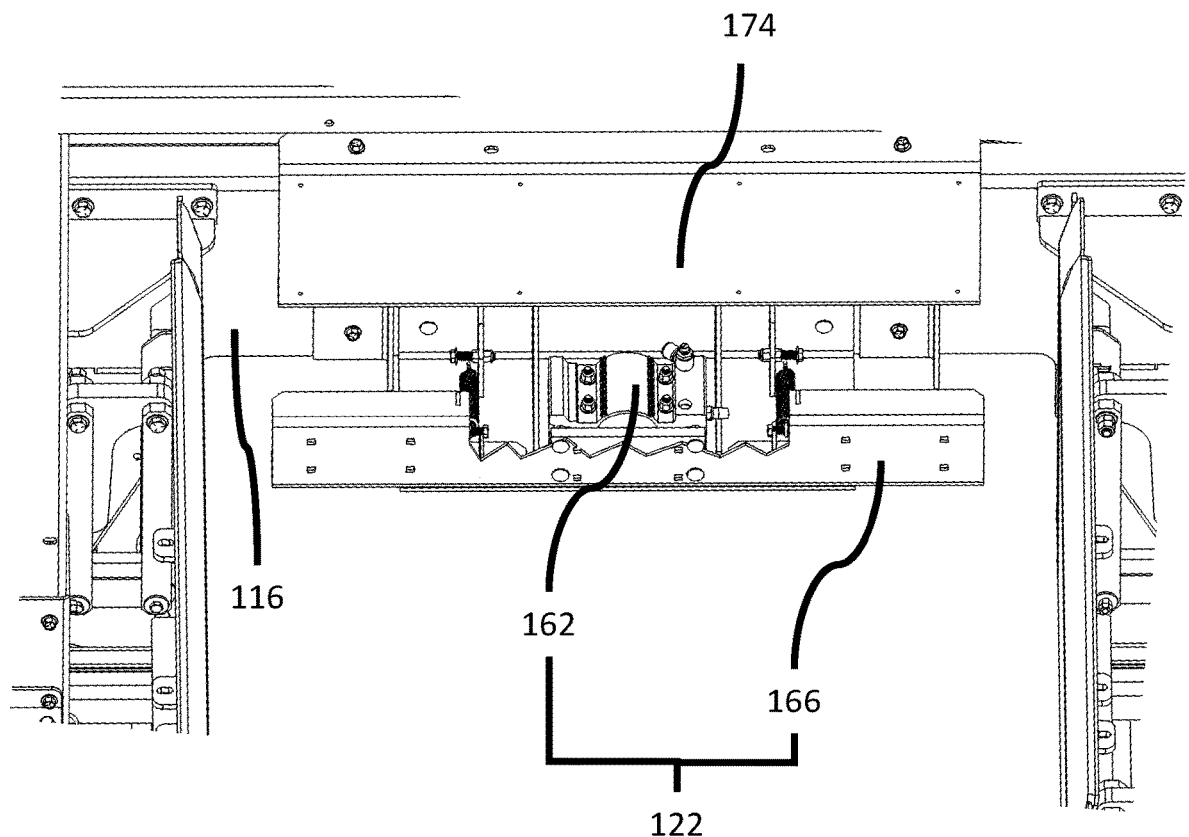
FIG. 6B depicts a partial top down cutaway view of FIG. 6A.

Referring now to FIG. 6B a partial cutaway view of the rear clamping mechanism 122 is depicted. The rear clamping mechanism 122 includes a pressure plate 166, an extension assembly 162. It will be noted that in this embodiment the rear bumper 174 is substantially in-line with the pressure plate 166 of the rear clamping mechanism 122 when the rear clamping mechanism 122 is in its deactivated state.

Figure 6C:
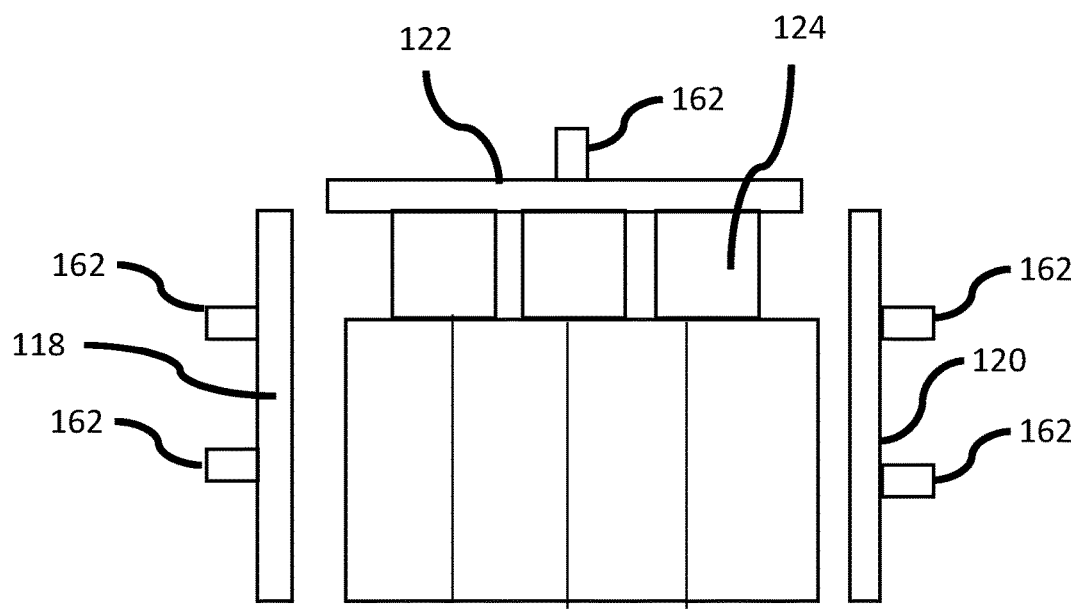
FIG. 6C depicts a load in the apparatus interacting with the rear clamp.

Referring now to FIG. 6C, the pallet load 124 is shown having product that is next to each other without voids, and product that is on the same layer with voids in between them. Commonly, the next layer of product above or below will be the same pattern rotated 180 degrees. A skilled person would understand that a two sided clamping apparatus (e.g. an electrically powered stationary two sided clamp, or a forklift mounted two sided clamp) cannot safely and/or securely clamp this type of pallet load as the product with voids will not be clamped, and therefore will sag and/or fall out of the clamp. A skilled person would also understand that a four sided clamping apparatus may be able to deal with the clamping of loads with voids, although the 4 sided clamp is more expensive to build and more complicated to operate.

Referring now to FIG. 6C, in some embodiments the rear clamping mechanism 122 is configured to allow for any voids that may be present in the lowest rear layers of product so that the bottom layer of product, once secured, forms a stable base on which the remaining layers of product of the pallet load (FIG. 3A 124) can be supported. For instance, in some embodiments the rear clamping mechanism 122 is configured to extend further into the clamping zone 108 (when compared to the first-side clamp and/or second-side clamp) thereby allowing for, at least in part, any voids present in the bottom layer of the product at the rear of the pallet load (FIG. 3 124). In another embodiment the rear clamping mechanism 122 is configured to apply pressure or more pressure to the bottom layer of product of the pallet load (FIG. 3A 124), again to allow for any voids present in the bottom layer of the product of the pallet load (FIG. 3A 124). In another embodiment, the rear clamping mechanism 122 is for applying pressure to the bottom layer of the pallet load at the rear for more securely clamping the pallet load 124.

In the embodiment depicted in FIG. 1-FIG. 6 the apparatus 100 further includes load detector 128 configured to detect improperly secured loads. The load detector 128 is used to detect whether a load is improperly secured by detecting whether the bottom of the pallet load (FIG. 3A 124), once the clamping mechanism 122 has been activated, drops, sags, droops, or otherwise crosses any portion of a plane that is below the bottom of the clamp assembly 106. Improperly secured loads typically indicate that the pallet load (FIG. 3A 124) is not properly secured and that some or all the product layers of the pallet load (FIG. 3 124) may fall once the pallet (FIG. 3A 140) has been separated from the pallet load (FIG. 3 124).

In an embodiment, once the pallet load 124 is secured by the clamp assembly 106 the operator lowers the pallet 140, thereby separating the pallet 140 from the pallet load 124. If the now secured pallet load 124 is adequately secured, then the pallet load 124 will not drop, sag, or otherwise cross any portion of a plane that is below the bottom of the clamp assembly 106. An operator would then monitor the load detector 128 as the pallet 140 is lowered to confirm that the pallet load 124 is secured. Once the operator is satisfied that the pallet load 124 is secured, then the operator can remove the pallet 140 from the pallet-receiving zone 104 and replace the pallet with a different pallet.

Referring now to FIG. 3B, If, however, the pallet load 124 is improperly secured, then as the operator begins the separate the pallet 140 from the pallet load 124 the pallet load 124 will begin to drop, sag, or otherwise cross any portion of a plane that is below the bottom of the clamp assembly 106. Once the load detector 128 detects that the pallet load 124 improperly secured, then the operator will be notified that the pallet load 124 is insecure. In the embodiment depicted in FIG. 3B the load detector 128 causes a signal light 130 to illuminate, notifying the operator that the pallet load 124 is insecure. The operator can then raise the pallet 140 towards the improperly secured pallet load 124 to avoid the improperly secured pallet load 124 from falling.

In the embodiment depicted in FIG. 1-FIG. 6, the load detector is a photoeye 144. In this embodiment the photoeye 144 is set for the width of the pallet and "looks" across the center of the pallet from left to right. The photoeye 144 is battery powered. The signal light 130 is battery powered.

If the load or a portion of the load drops, sags, droops, or otherwise crosses a beam emitted by the photoeye 144 then the operator will be alerted that the load is improperly secured. In the embodiment depicted in FIG. 1-FIG. 6 a signal light 130 (in this embodiment a green light) is used to alert the operator that the load is properly secured. In the case where the load is improperly secured then the photoeye 144 will detect that the load is insecure and the signal light 130 will turn off, thereby notifying to the operator that the load is insecure. It will be appreciated that other ways to detect an improperly secured load and to alert the operator of such a condition can be used without departing from the scope of this disclosure. An auditory signal or alert may also be used (via a speaker) to indicate to the operator that the load is improperly secured. Other visual signals, such as a strobing light, may also be used to indicate to the operator that the load is improperly secured.

Figure 7:
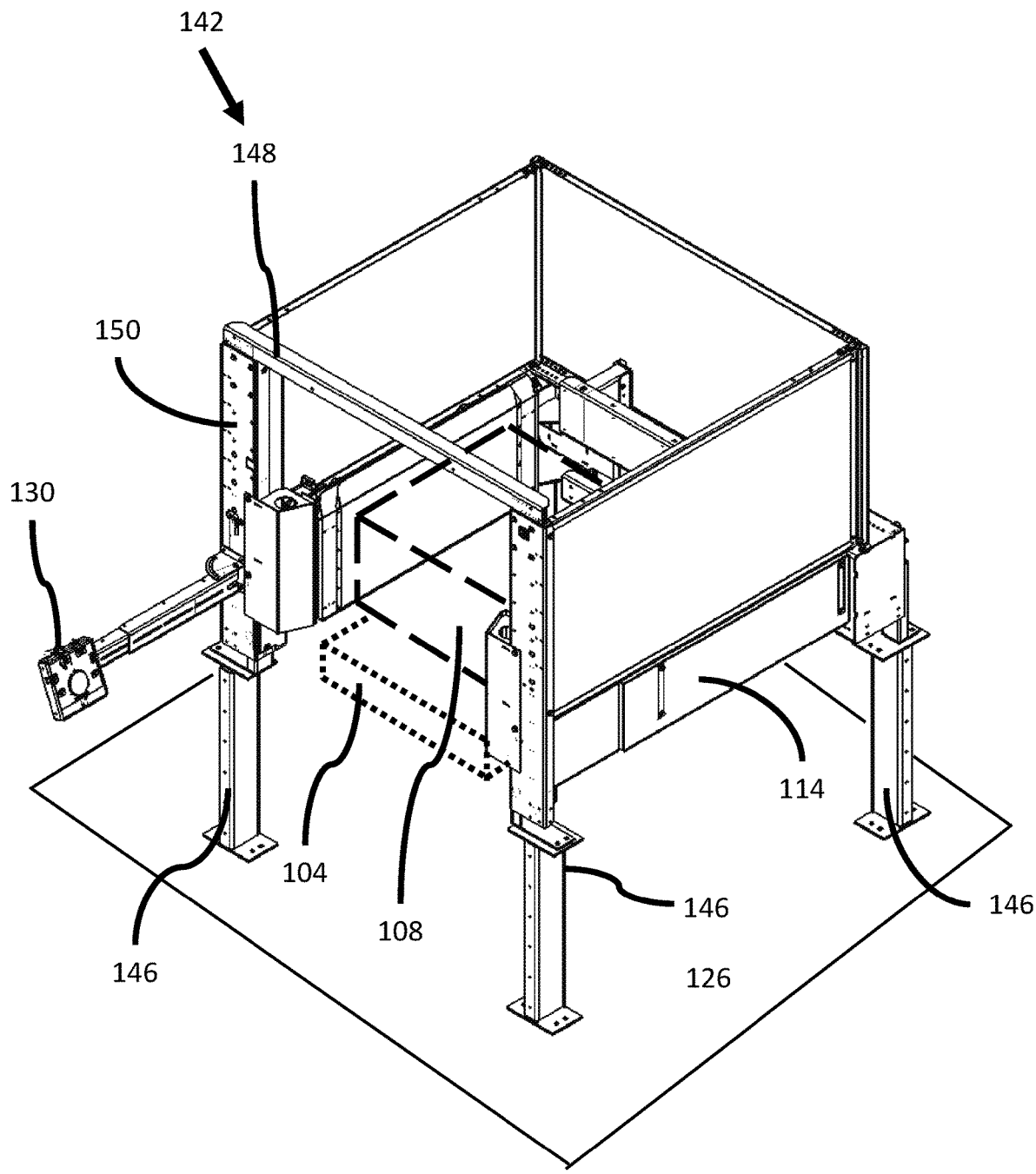
FIG. 7 depicts a perspective view of another embodiment of the apparatus.
Figure 8A:
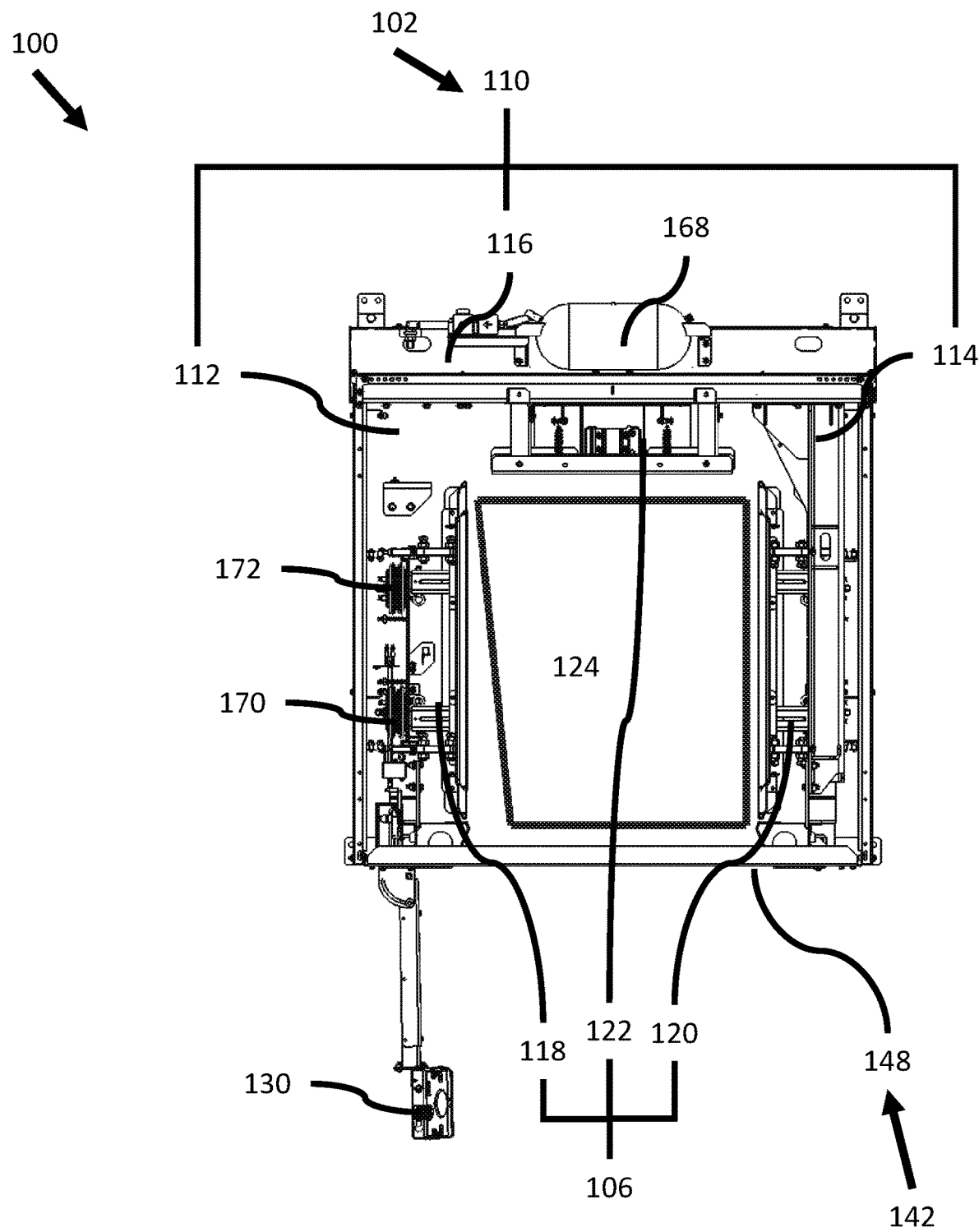
FIG. 8A depicts a top down partial cutaway view of an alternate embodiment of the apparatus.
Figure 8B:
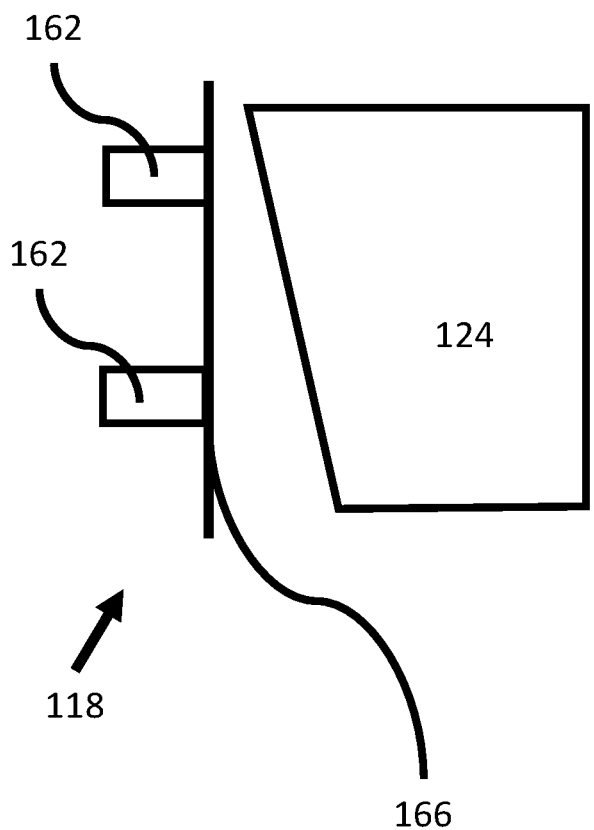
FIG. 8B depicts a simplified top down partial cutaway view of FIG. 8A.
Figure 8C:
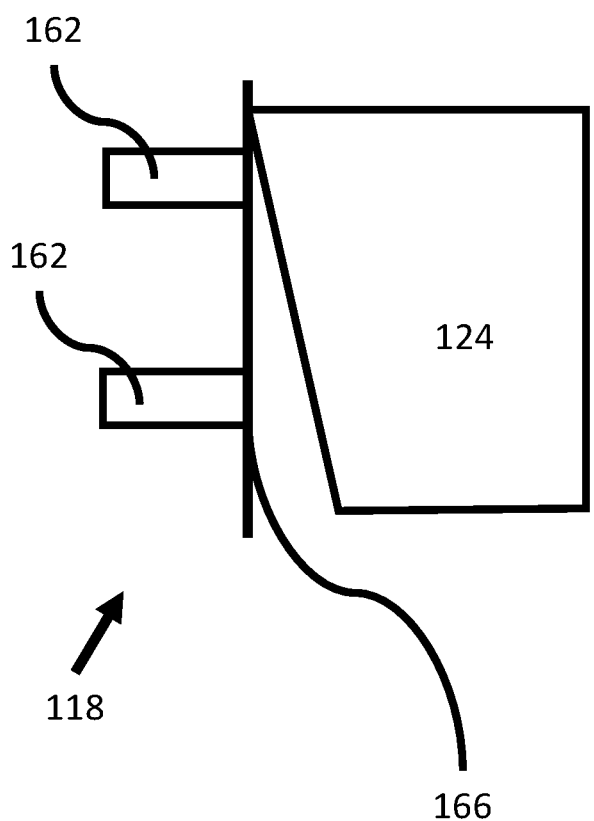
FIG. 8C depicts a simplified top down partial cutaway view of FIG. 8A.
Figure 8D:
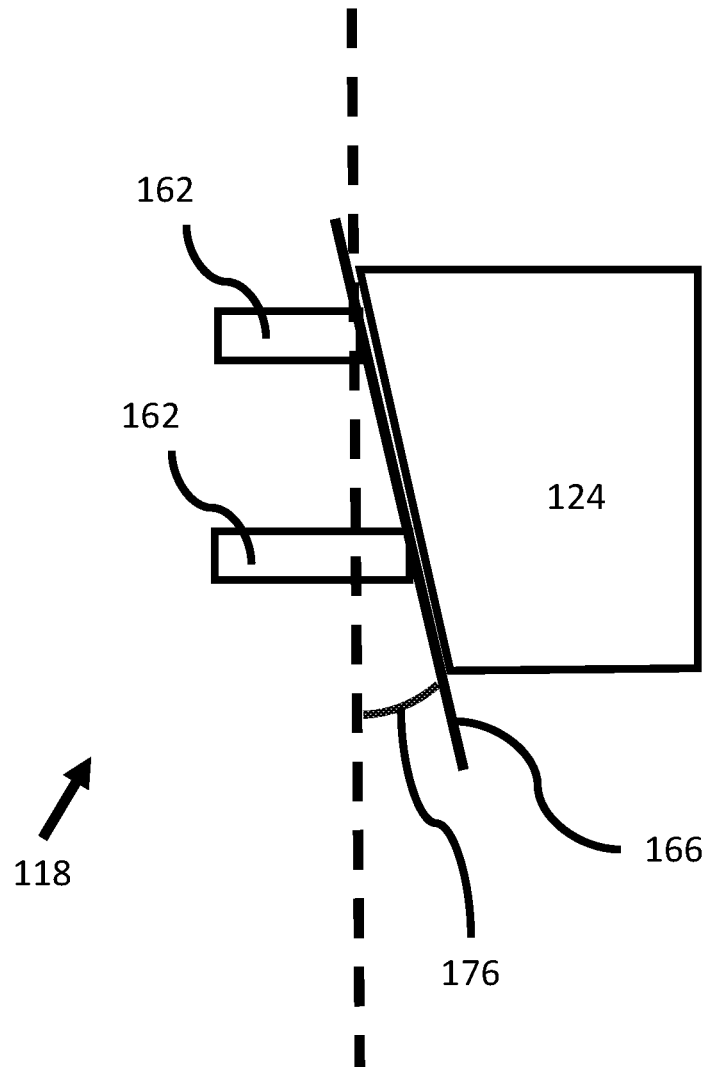
FIG. 8D depicts a simplified top down partial cutaway view of FIG. 8A.

Referring now to FIG. 7, in another embodiment the apparatus 100 is elevated from a work surface 126 using risers 146 attached the bottom of the first side 112 and the second side 114 respectively. In the embodiment depicted in FIG. 7 the risers 146 are attached (using known methods such as welding, nuts and bolts, rivets, screws, etc.) to each of the front end and the back end of the first side 112 and the second side 114 respectively.

Raising the apparatus 100 from the work surface 26 can improve the throughput of the apparatus 100 in situations where palletized product is stored on elevated shelves, for example. In scenarios where the apparatus 100 is elevated to approximately the same height as the raised shelves storing palletized product, the operator can move the pallet supporting the pallet load directly into the pallet-receiving assembly 102. The operator does not have to lower the palletized product to the level of the work surface 126 to exchange pallets (FIG. 3 140). This saves the operator the time of having to wait for the pallet transporter to lower the palletized product to the work surface 126.

Raising the apparatus can also assist in pallet splitting. Pallet splitting allows a larger pallet load to be split into two or more smaller loads. Rather than clamping the bottom layer of the pallet load 124, an operator can raise or lower the pallet load 124 (using, for example, a pallet transporter) so that the clamp assembly 106 secures a selected portion of the pallet load 124 that does not include the bottom layer of the pallet load. For instance, the operator can align the pallet load so that the clamp assembly 106 secures the portion of the pallet load 124 above the mid-point. As the operator lowers the pallet 140, the portion of the pallet load 124 that is unsecured (i.e., below the mid-point) will be lowered with the pallet 140. Once the pallet 140 with the unsecured portion of the pallet load 124 is removed from the pallet-receiving zone 104, a different pallet is then brought into the pallet receiving zone 104 and raised to the bottom of the secured pallet load 124. The original pallet load is split into two separate loads in this manner.

In some scenarios the pallet load 124 may not be rectangular or square in shape. In these scenarios the clamp assembly 106 is configured to conform, at least in part, to the sides of the pallet load 124 to secure the pallet load 124.

Referring now to FIG. 8A to FIG. 8D, another embodiment of the apparatus 100 is depicted. In this embodiment the first-side clamping mechanism 118, the second-side clamping mechanism 120, or both, are configured to secure an irregularly shaped pallet load 124.

In this embodiment the first-side clamping mechanism 118, the second side clamping mechanism 120, or both are configured to adjust the yaw (as shown by the yaw angle 176 in FIG. 8D) of a pressure plate 166 (or clamp face) once the respective clamp mechanism is activated. The first-side clamping mechanism 118 and the second-side clamping mechanism 120 are configured to adjust the yaw independently. The first-side mechanism 118 adjusts the yaw of the attached pressure plate 166. The second-side mechanism 120 adjusts the yaw of the attached pressure plate 166. The first-side mechanism 118 and the second-side mechanism 120 adjust the yaw of the pressure plate attached 166 to the first-side mechanism 118 and the pressure plate 166 of the second-side mechanism 120 independently.

By way of example, in the scenario where the pallet load 124 is irregularly shaped in the area corresponding to the front of the first-side clamping mechanism 118 as shown in FIG. 8A to FIG. 8D, the first-side clamping mechanism 118, once activated, will adjust the yaw (as shown by the yaw angle 176 in FIG. 8D) of the pressure plate 166 (or clamp face) so that the pressure plate 166 (or clamp face) of the first-side clamping mechanism 118 will contact (and secure) the irregularly shaped pallet load 124.

Figure 9:
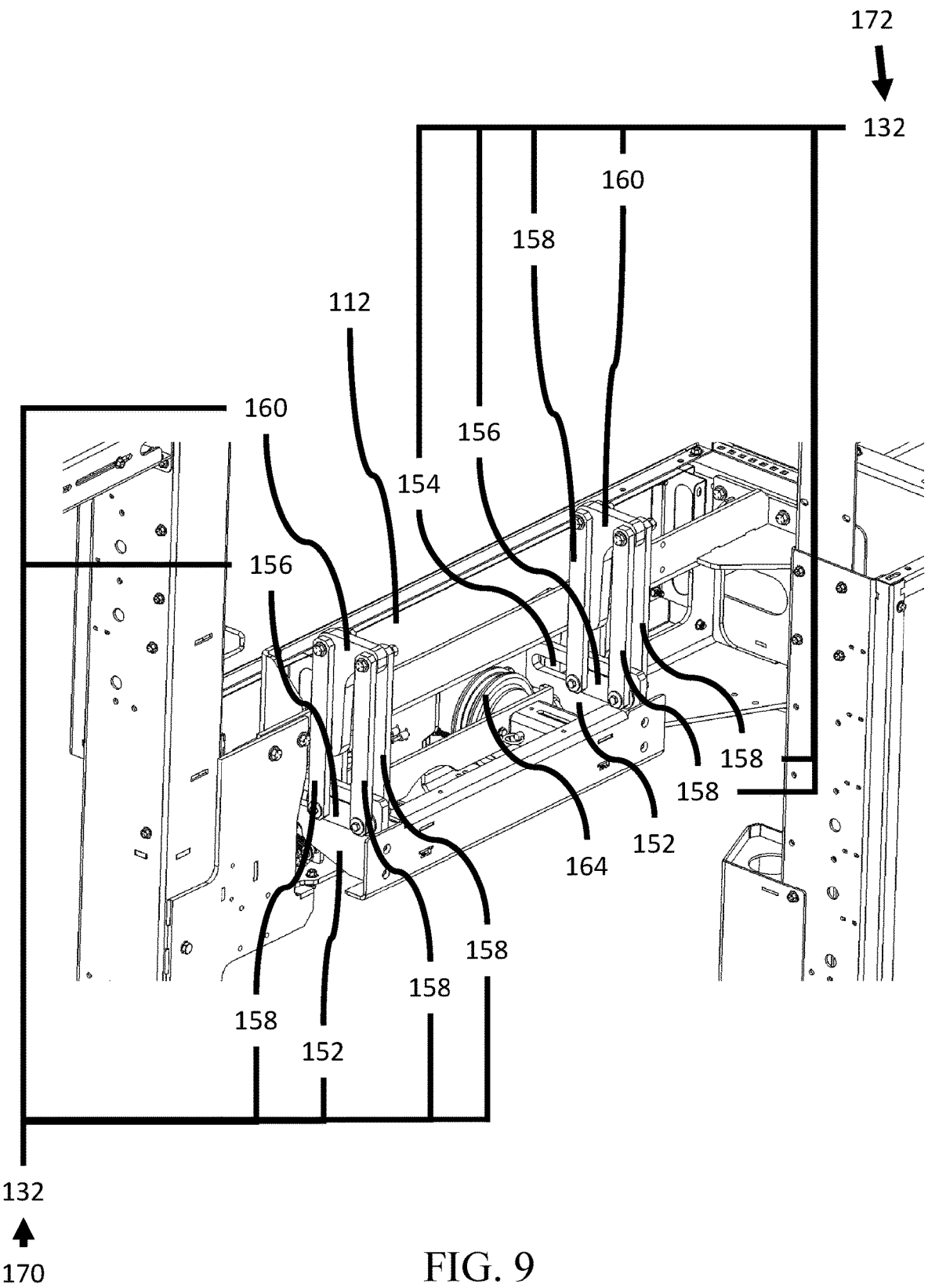
FIG. 9 depicts a partial perspective view of a first-side clamping mechanism.

Referring now to FIG. 9, an embodiment of the first-side clamping mechanism 118 is depicted. In FIG. 9 the pressure plate 166 (or clamp face) of the first-side clamping mechanism 118 has been removed to expose the assembly for the purposes of this discussion. It will be appreciated that the second-side clamping mechanism 120 will also have a similar structure mirrored on the second side 114.

In this embodiment each of the first-side clamping mechanism 118 and the second-side clamping mechanism 120 has a front assembly 170 and a rear assembly 172. That is, there are two assemblies (front and rear) for the first-side clamping mechanism 118, and two assemblies (front and rear) for the second-side clamping mechanism 120. It will be appreciated that fewer or more assemblies can be used depending on the application.

In the embodiment depicted in FIG. 9-FIG. 12 the front assembly 170 and the rear assembly 172 of the first-side clamping mechanism 118 are identical. Furthermore, the front assembly 170 and the rear assembly 172 of the second-side clamping mechanism 118 are also identical. In other embodiments the front assembly 170 and the rear assembly 172 may be different. For instance, in some embodiments it may be beneficial for the front assembly 170 to have a support member 152 having a longer slot 154 than the rear assembly 172 (or vice-versa).

Referring again to FIG. 9, the front assembly 170 has a pivot 132. The pivot 132 has a support member 152 attached to the pressure plate 166 (not shown). In this embodiment the support member 152 is bolted to the pressure plate 166. In other embodiments the support member 152 may be welded, riveted, or otherwise affixed to the pressure plate 166 using any known means. The pivot 132 has an arm 160. The arm 160 is attached to the first side 112. In this embodiment, the arm 160 is bolted to the first side 112. In other embodiments the arm 160 may be welded, riveted, or otherwise affixed to the first side 112 using any known means. The arm 160 is for connecting the support member 152 to the first side 112 through the movable arms 158.

In the embodiment depicted in FIG. 9 two support members 152 are provided for each of the first-side clamping mechanism 118 and the second-side clamping mechanism 120. It will be appreciated that fewer or more support structures, or different support structures, can be used depending on the application.

In this embodiment the support member 152 further includes a slot 154 that is configured to guide a cam follower unit 156. The slot 154 and cam follower unit 156 combination allows each support member 152 to move independently of any other support member 152 on the respective side of the clamping mechanism in a substantially horizontal direction while restricting movement in the vertical or lateral direction. That is, it allows for the front assembly 170 and the rear assembly 172 to move independently of each other in a horizontal direction towards and away from the clamping zone 108. When viewing from the front of the apparatus 100 the clamping mechanism 118 can have a yaw angle (as shown by the yaw angle 176 in FIG. 8D). Since the support member 152 restricts movement in the vertical or lateral direction, other undesirable movement such as forward/back shifting, vertical movement, roll, and/or pitch is reduced or minimized.

The pivot 132 further includes movable arms 158, each having two ends. The movable arms 158, at one end, are pivotingly connected to the cam follower unit 156 that is positioned in the slot 154 of the support member 152 and pivotingly connected, at the other end, to an arm 160 extending substantially perpendicularly from the first-side 112. In this embodiment each support member 152 and arm 160 has four movable arms 158 connected to them in total—that is, two on each side of the support member 152 and arm 160. The pivotingly connected arms 158, arm 160, and cam follower unit 156 form a parallelogram. This parallelogram structure minimizes the roll of the pressure plate 166. Roll can lead to poor clamping of the pallet load 124, especially the bottom of the pallet load 124.

Figure 10:
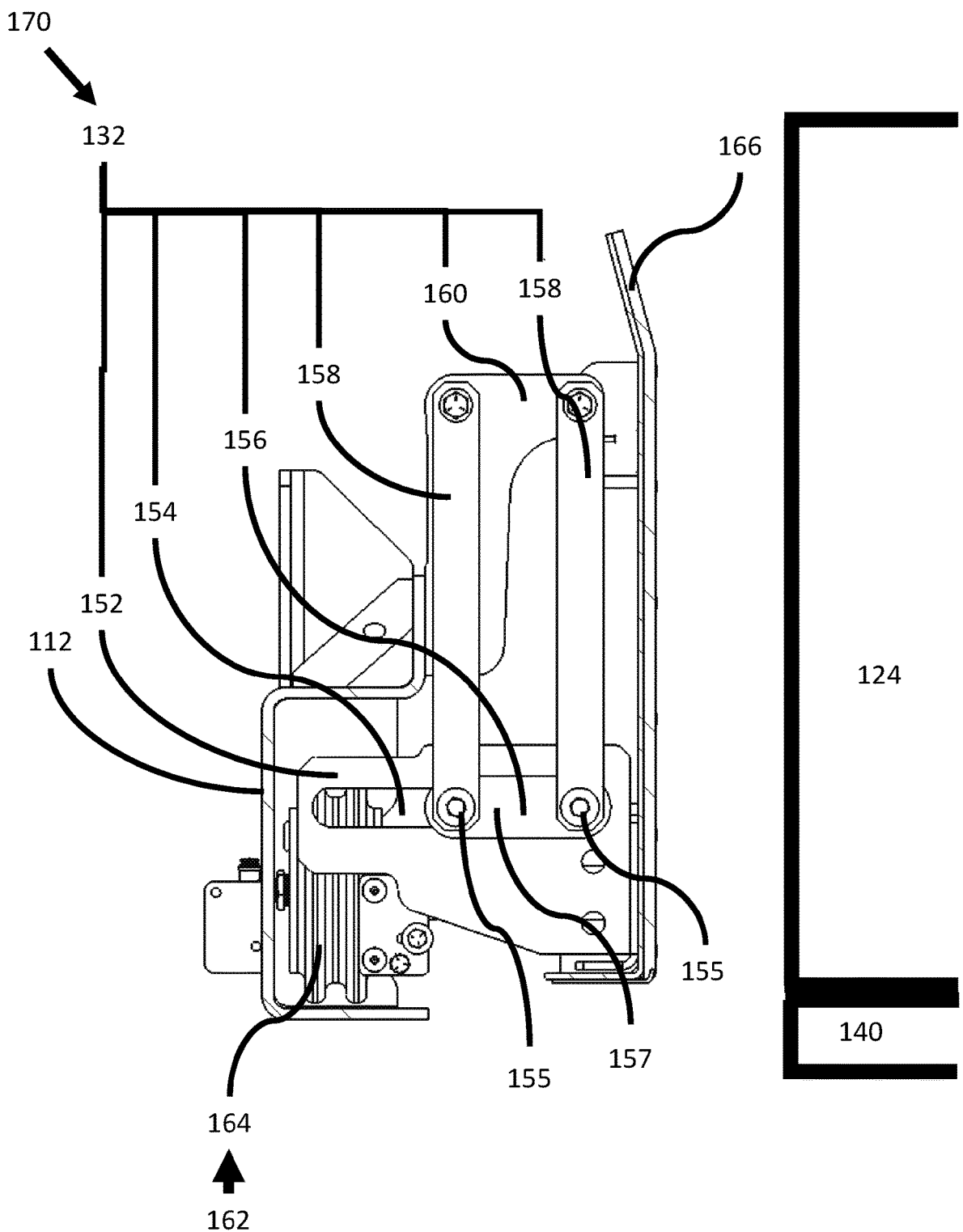
FIG. 10 depicts a front partial view of a first-side clamping mechanism.

In the embodiment shown in FIG. 10, the cam follower unit 156 comprises two cam followers 155 connected by a link plate 157. The length of the link plate 157 is about the same length as the arm 160. The link plate cooperates with the arm 160 to keep the movable arms 158 parallel to each other.

The front assembly 170 further includes an extension assembly 162. The extension assembly 162 is attached to the first side 112 and is configured to generate an inwardly directed clamping force on the pressure plate 166. In this example the extension assembly 162 is an airbag 164 and a pneumatic circuit (not shown) for inflating the airbag 164. The airbags 164 are resilient cylinders having pleated side walls that are adapted to extend flexibly along the longitudinal axis of the cylinder. One end of the airbag 162 is connected to the first side 112 via the pneumatic circuit. The other end of the airbag is attached to the pressure plate 166 by known mechanical means. In this example embodiment, the pneumatic circuit includes a header (not shown) attached to a compressed air source 168 through a network of pneumatic hoses, valves, and couplers. For retraction, springs (not shown) are used to retract the pressure plate 166. A skilled person would understand a variety of known means may be used to retract the pressure plate 166 once the pneumatic circuit is turned off.

Figure 13:
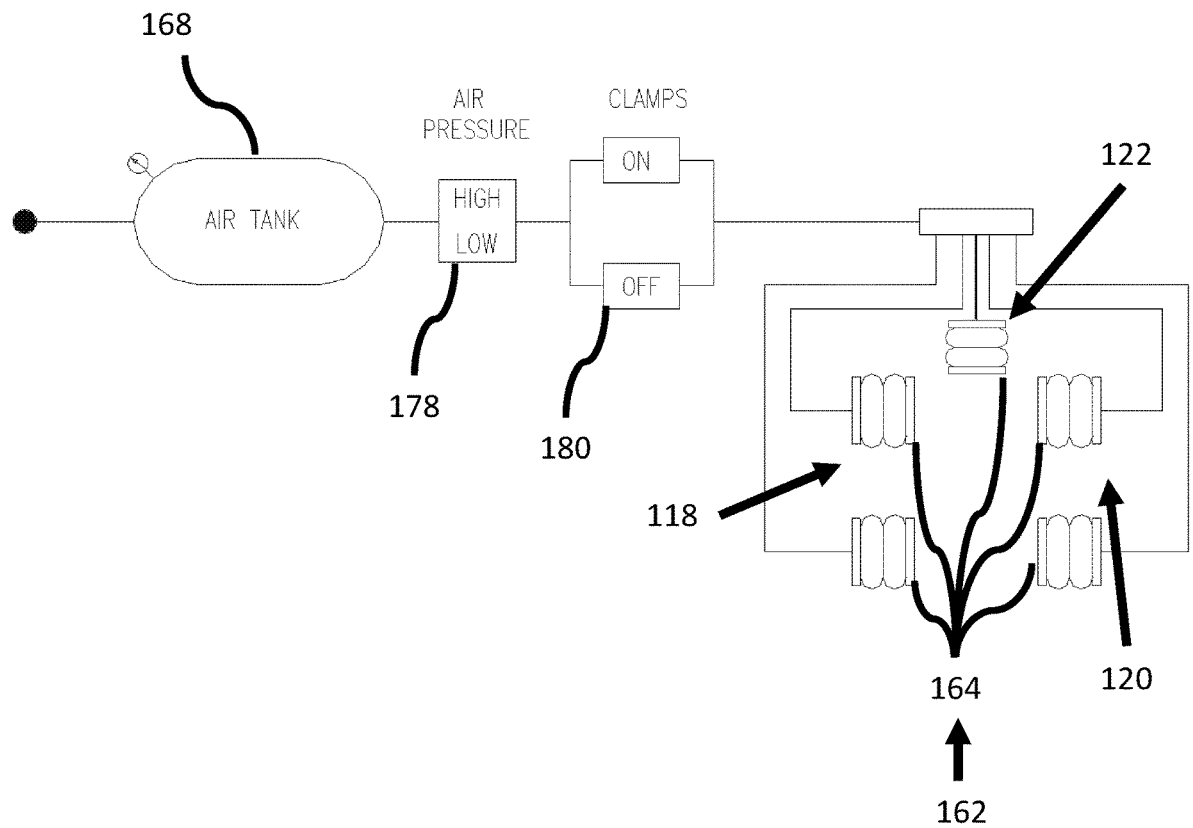
FIG. 13 depicts a pneumatic circuit.

An embodiment of the pneumatic circuit is provided in FIG. 13. The pneumatic circuit comprises a compressed air source 168 connected to an air pressure selector switch 178 and a clamp on/off switch 180. Then, the pneumatic circuit is connected to the extension assemblies 162 for the first side clamping mechanism 118, second side clamping mechanism 120, and rear clamping mechanism 122. The air pressure selector switch 178 has at least two settings for a high pressure setting and a low pressure setting. The high pressure setting provides a greater clamping force for more secure clamping. The low pressure setting provides a clamping force that is appropriate for more fragile pallet loads. The high pressure setting ranges from 30-60 pounds per square inch (PSI). The high pressure setting may be set at 45 PSI. The low pressure setting ranges from 20-30 PSI. The low pressure setting may be set at 25 PSI. The clamp on/off switch 180 activates the pneumatic circuit to activate the clamp assembly 106 when on, and deactivates the clamp assembly 106 when off. When the clamp on/off switch 180 is on, the clamp assembly 106 activates the first side clamping mechanism 118, second side clamping mechanism 120 and rear clamping mechanism 122 at the same time. In another embodiment, the clamp assembly 106 activates the first-side clamping mechanism 118, second-side mechanism 120, and/or rear-clamping mechanism 122 independently. When the clamp on/off switch is off the clamp assembly 106 deactivates the first side clamping mechanism 118, second side clamping mechanism 120 and rear clamping mechanism 122 at the same time. A skilled person would understand that controlling the force of hydraulic clamping is difficult and is done by "feel" or operator skill and/or based on the length of time the clamps are held on. Therefore, hydraulic clamping is more prone to causing product damage.

The apparatus 100 requires only pneumatic energy from the compressed air source 168 to operate the clamp assembly 106, and does not require electrical energy. The pallet exchange speeds of the apparatus 100 may be up to 120 pallets per hour. In comparison, a skilled person would understand that existing prior art may have pallet exchange speeds of about 15 to 20 pallets per hour.

Figure 11:
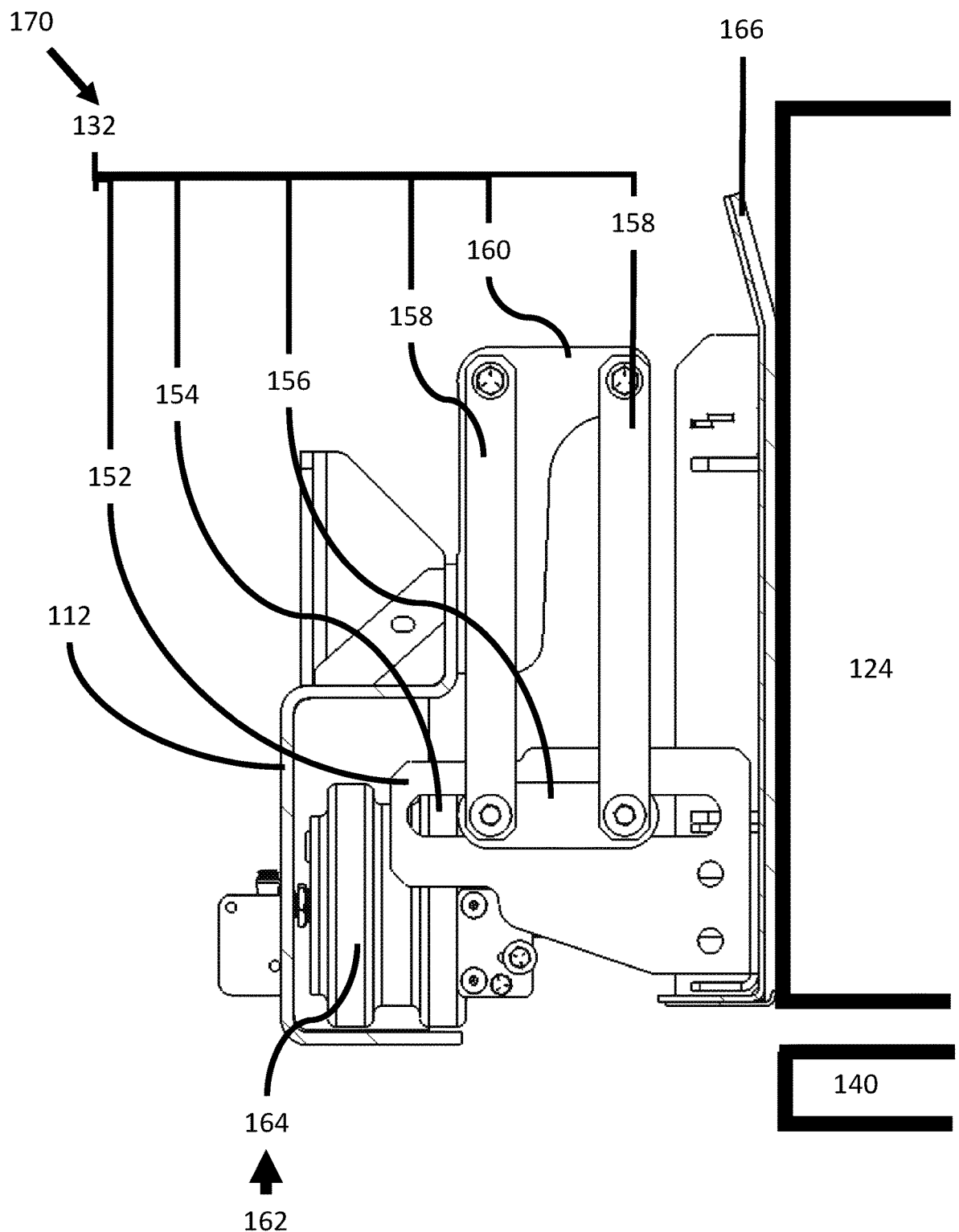
FIG. 11 depicts a front partial view of a first-side clamping mechanism in a partially extended state.
Figure 12:
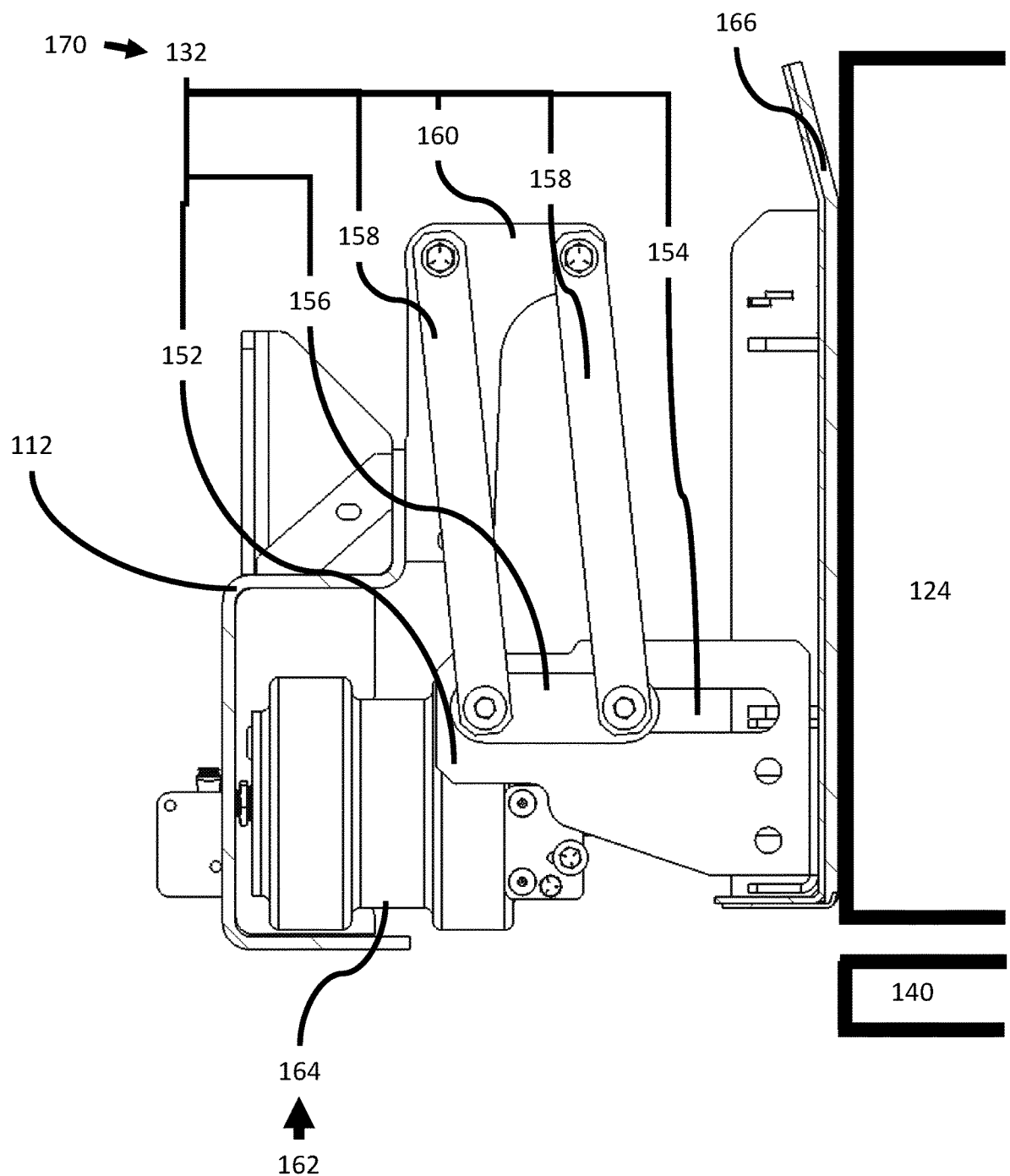
FIG. 12 depicts a front partial view of a first-side clamping mechanism in a fully extended state.

Referring now to FIG. 10-FIG. 12, an example sequence for the operation of a part of the clamp assembly 106 is provided. Specifically, a front view of the front assembly 170 of the first-side clamping mechanism 120 is depicted. The second, rear assembly 172 of the first-side clamping mechanism 120 is not depicted, though both operate in the same manner.

In FIG. 10 the clamp assembly 106 is in a deactivated state. In this state the clamp assembly 106 is not supporting a load. The movable arms 158 are substantially perpendicular to the support member 152 and the arm 160. The airbag 164 is deflated. The pressure plate 166 is not contacting a pallet load 124. In this state the clamp assembly 106 is in its most retracted position. This position allows pallets 140 and their associated loads 124 to be moved into and out of the pallet-receiving zone 104 by a pallet transporter (not shown).

Referring now to FIG. 11, the clamp assembly 106 is in an activated state. In this state the clamp assembly 106 is partially extending into the clamping zone 108 to meet a side of the pallet load 124 corresponding to the first-side clamping mechanism 118. In this example the clamp assembly 106 is not required to reach its full extension for the pressure plate 166 of the clamp assembly 106 to contact (and secure, once all other clamp assemblies 106 have contacted the pallet load 124) the pallet load 124. In this example the airbag 164 is only partially filled, and sufficient pressure is maintained in the airbag 164 to ensure good contact between the pressure plate 166 and the pallet load 124. It will be appreciated that an air pressure sensor or gauge can be used to regulate the pressure of the airbag 164 to ensure that sufficient pressure is maintained in the airbag 164 to support the pallet load 124.

Referring now to FIG. 12, in some scenarios the pallet load 124 is irregularly shaped or small. In these scenarios the clamp assembly 106, once activated, can extend further into the clamping-zone 108 to contact the pallet load 124.

In the scenario where the pallet load 124 is irregularly shaped, as the extension mechanism 162 extends the clamp assembly 106 towards the clamping zone 108 one end of the clamp assembly 106 may contact the pallet load 124 before the other end of the clamp assembly 106 contacts the pallet load 124. For instance, the front assembly 170 of the first-side clamping mechanism 118 may contact the irregularly shaped pallet load 124 before the rear assembly 172 of the first-side clamping mechanism 118 has fully contacted the irregularly shaped pallet load 124. In this scenario the rear assembly 172 of the first-side clamping mechanism 118 can continue to extend substantially horizontally inwards towards the clamping zone 108 so that the first-side clamping mechanism 118 fully contacts the irregularly shaped pallet load 124. When viewing the clamping mechanism 118 from the front of the apparatus, then, the first-side clamping mechanism 118 has a yaw angle (as shown by the yaw angle 176 in FIG. 8D). This yaw angle (as shown by the yaw angle 176 in FIG. 8D) allows the clamp assembly 106 to conform to irregularly shaped pallet loads, especially for trapezoidal loads, or loads that are not square or rectangular.

The amount of travel provided in the slot 154 and cam follower unit 156 will determine the maximum amount of yaw for the pressure plate 166 of the apparatus 100. In this embodiment the slot 154 and cam follower unit 156 combination allows for a yaw travel of approximately 2-4 inches. It will be appreciated that other maximum yaw angles will depend on the characteristics of the typical load being handled.

An embodiment of how an operator would use the apparatus is as follows. In this embodiment the operator is using a pallet jack, though the operator can also use a walkie-rider, forklift, or any other pallet handling equipment.

The operator moves a pallet 140 having a pallet load 124 into a pallet-receiving zone 104. The operator then raises the pallet 140 having the pallet load 124 so that the pallet load 124 is, at least in part, in a clamping zone 108. The operator then activates a clamp assembly 106 so that the pallet load 124 is supported, at least in part, by the clamp assembly 106. Once the pallet load 124 is supported, the operator then lowers the pallet 140 from the pallet load 124. In some embodiments the apparatus is configured to detect whether the pallet load 124 is insecure, using a photoeye 144 for instance. If the pallet load 124 is determined to be insecure then a signal light 130 is deactivated to alert the operator that the load is insecure.

Now that the pallet 140 is separated from the pallet load 124 the operator is free to remove the pallet 140 from the pallet-receiving zone 104.

The operator can now replace the pallet. The operator first moves a different pallet into the pallet-receiving zone 104. The operator then raises the pallet to the pallet load 124 so that the pallet 140 meets the bottom of the pallet load 124. The operator then deactivates the clamp assembly 106 so that the pallet load 124 is supported by the different pallet. The operator can then remove the different pallet supporting the pallet load 124 from the pallet-receiving zone 104. It will be noted that, in this embodiment, the clamp assembly 106 is configured to adjust a yaw to secure an irregularly shaped pallet load 124 once the clamp assembly is activated.

The following clauses describe embodiments of the apparatus and method. Clause 1: An apparatus (100) comprising: a pallet-receiving assembly (102) having a pallet-receiving zone (104) configured to receive, at least in part, a pallet supporting a pallet load; and a clamp assembly (106) connected to the pallet-receiving assembly (102) having a clamping zone (108) configured to secure a first side, a second side, and a rear of the pallet load once the clamp assembly (106) is activated so that the pallet load is supported, at least in part, by the clamp assembly (106). Clause 2: The apparatus of clause 1, the pallet-receiving assembly 102 comprising: a frame (110) defining the pallet receiving zone (104), the frame (110) having a first side (112), a second side (114) substantially parallel to and separated from the first side 110, and a rear (116) connecting the first side (112) and the second side (114) so that the first side 112 is substantially parallel to the second side 114 and that the first side 112 and second side 114 are substantially perpendicular to the rear 116. Clause 3: The apparatus of clause 2, the clamp assembly 106 comprising: a first-side clamping mechanism (118) attached to the first side (112) of the frame (110), the first-side clamping mechanism (118) configured to move inwardly towards the clamping-zone (108) once the first-side clamping mechanism (112) is activated; a second-side clamping mechanism (120) attached to the second side (120) of the frame (110), the second-side clamping mechanism (120) configured to move inwardly towards the clamping-zone (108) once the second-side clamping mechanism (120) is activated; so that once each of the first-side clamping mechanism (112), second-side clamping mechanism (114), and rear-clamping mechanism (122) are activated the first-side clamping mechanism (118) and the second-side clamping mechanism (120), secures, at least in part, the pallet load so that the pallet does not support the pallet load. Clause 4: The apparatus of clause 3, the clamp assembly 106 further comprising: a rear-clamping mechanism (122) attached to the rear (116) of the frame (110), the rear clamping mechanism (122) configured to move inwardly towards the clamping-zone (108) once the rear clamping mechanism (122) is activated so that the rear clamping mechanism (122), once activated, engages a rear lower portion of the pallet load (124). Clause 5: The apparatus of any one of clauses 1 to 4, wherein the clamp assembly (106) is activated by a pneumatic circuit. Clause 6: The apparatus of any one of clauses 1 to 5 wherein the pallet receiving assembly (102) is elevated from a work surface (126). Clause 7: The apparatus of any one of clauses 1 to 6 wherein the pallet receiving assembly (102) is proximate to a work surface (126). Clause 8: The apparatus of any one of clause 1 to 7 further comprising a load detector (128) configured to detect whether the pallet load is improperly secured once the clamp assembly (106) is activated and the pallet is separated from the pallet load (124). Clause 9: The apparatus of clause 8 wherein the load detector (128) is a photoeye (130). Clause 10: The apparatus of any one of clauses 8 or 9 wherein a signal light (130) is activated once the load detector (128) detects that the pallet load (124) is improperly secured. Clause 11: The apparatus of any one of clauses 3 to 10 wherein each of the first-side clamping mechanism (118) and the second-side clamping mechanism (120) includes: a front assembly having a front pivot and a front extension assembly; and a rear assembly (172) having rear pivot and rear extension assembly; so that the first-side clamping mechanism (118), the second-side clamping mechanism (120), or both adjusts a yaw angle to match the shape of the pallet load (124) once the first-side clamping mechanism (118), the second-side clamping mechanism (120), or both are activated. Clause 12: An apparatus comprising: a first-side clamping mechanism (118) attached to a first side (112) of a frame (110), the first-side clamping mechanism (118) configured to move inwardly towards a clamping-zone (108) once the first-side clamping mechanism (112) is activated; and a second-side clamping mechanism (120) attached to a second side (114) of the frame (110), the second-side clamping mechanism (120) configured to move inwardly towards the clamping-zone (108) once the second-side clamping mechanism (120) is activated; wherein the first-side clamping mechanism (118), the second-side clamping mechanism (120), or both adjusts a yaw angle to match a shape of a pallet load (124) once the first-side clamping mechanism (118), the second-side clamping mechanism (120), or both are activated. Clause 13: The apparatus of clause 12 further comprising: a rear-clamping mechanism (122) attached to the rear (116) of the frame (110), the rear clamping mechanism (122) configured to move inwardly towards the clamping-zone (108) once the rear clamping mechanism (122) is activated. Clause 14: The apparatus of clause 13 wherein the first-side clamping mechanism (118), second-side clamping mechanism (120), and the rear clamping mechanism (122) are activated by a pneumatic circuit. Clause 15: The apparatus of any one of clauses 12 to 14, the apparatus further comprising a load detector (128) configured to detect whether the pallet load is improperly secured once the clamp assembly (106) is activated and the pallet is separated from the pallet load (124). Clause 16: A method, comprising: activating a clamp assembly (106) so that a pallet load (124) on a pallet (140) is supported, at least in part, by the clamp assembly (106), the pallet load (124) in a clamping zone (108) and the pallet in a pallet-receiving zone (104); wherein the clamp assembly (106) is configured to adjust a yaw to secure an irregularly shaped pallet load (124). Clause 17: The method of clause 16, further comprising: lowering the pallet (140) from the pallet load (124); detecting whether the pallet load (124) is securely clamped. Clause 18: The method of clause 17, further comprising: activating a signal light (13) if the pallet load (124) is detected to be secure. Clause 19: The method of any one of clauses 17 to 18, further comprising: removing the pallet (140) from the pallet-receiving zone (104); moving a different pallet into the pallet-receiving zone (104); raising the pallet to the pallet load (124); deactivating the clamp assembly (106) so that the pallet load (124) is supported by the different pallet; and removing the different pallet supporting the pallet load (124) from the pallet-receiving zone (104). Clause 20: The method of any one of clauses 16 to 19, further comprising: moving the pallet (140) having the pallet load (124) into the pallet-receiving zone (104); raising the pallet (140) having the pallet load (124) so that the pallet load (124) is, at least in part, in the clamping zone (108).

The following clauses are offered as further description of the examples of the apparatus and method. Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or any portion of any other clause, etc. Clause 1: an apparatus (100) of any clause in this paragraph comprising: a pallet-receiving assembly (102) having a pallet-receiving zone (104) configured to receive, at least in part, a pallet (140) supporting a pallet load (124); a clamp assembly (106) connected to the pallet-receiving assembly (102) having a clamping zone (108) configured to secure a first side, a second side, and a rear of the pallet load (124) once the clamp assembly (106) is activated by a pneumatic circuit so that the pallet load (124) is supported by the clamp assembly (106); and the pneumatic circuit is for controlling a clamping pressure of the clamp assembly (106). Clause 2: The apparatus of any clause in this paragraph, wherein: the clamp assembly 106 comprises: a first-side clamping mechanism (118) attached to the first side (112) of the frame (110), a second-side clamping mechanism (120) attached to the second side (120) of the frame (110), and a rear-clamping mechanism (122) attached to the rear (116); and the first-side clamping mechanism (118), the second-side clamping mechanism (120), and the rear-clamping mechanism (122) are configured to move inwardly towards the clamping-zone (108) once the pneumatic circuit is activated, and the first-side clamping mechanism (112), the second-side clamping mechanism (114), and the rear-clamping mechanism (122) secures the pallet load (124) so that the pallet (140) does not support the secured part of the pallet load. Clause 3: The apparatus of any clause in this paragraph, wherein the first-side clamping mechanism (118), the second-side clamping mechanism (120), or both adjusts a yaw angle to match a shape of a pallet load (124) once the first-side clamping mechanism (118), the second-side clamping mechanism (120), or both are activated. Clause 4: The apparatus of any clause in this paragraph, wherein the rear-clamping mechanism is configured to secure a single layer of product of the pallet load (124) and/or configured to have a height of less than 5 to 10 inches. Clause 5: The apparatus of any clause in this paragraph, wherein the pallet load (124) contains voids. Clause 6: The apparatus of any clause in this paragraph, wherein: the first-side clamping mechanism (118) and the second-side clamping mechanism (120) includes: a front assembly (170) having a front pivot and a front extension assembly; a rear assembly (172) having rear pivot and rear extension assembly; and the front assembly (170) and the rear assembly (172) move independently of each other in a horizontal direction towards and away from the clamping zone (108) for adjusting a yaw angle of the pressure plate (166). Clause 7: The apparatus of any clause in this paragraph, further comprising, an air pressure selector switch for selecting between a high pressure and a low pressure for the pneumatic circuit; the low pressure for clamping soft or delicate products in the pallet load (124) and the high pressure for more securely clamping the pallet load (124). Clause 8: The apparatus of any clause in this paragraph, wherein, the high pressure ranges from between 30-60 psi, and the low pressure ranges from between 15-30 psi. Clause 9: The apparatus of any clause in this paragraph, further comprising a load detector (128) configured to detect whether the pallet load (124) is improperly secured once the clamp assembly (106) is activated and the pallet is separated from the pallet load (124). Clause 10: The apparatus of any clause in this paragraph, wherein the apparatus (100) is not electrically powered and/or the clamp assembly (106) is not electrically powered. Clause 11: A method, comprising: activating a clamp assembly (106) so that a pallet load (124) on a pallet (140) is supported by the clamp assembly (106), the pallet load (124) in a clamping zone (108) and the pallet in a pallet-receiving zone (104); and wherein the clamp assembly (106) is configured to adjust a yaw to secure the pallet load (124). Clause 12: The method of any clause in this paragraph, further wherein, the pallet load (124) comprises product with voids and/or the pallet load (124) is irregularly shaped. Clause 13: The method of any clause in this paragraph, further comprising: lowering the pallet (140) from the pallet load (124); detecting whether the pallet load (124) is securely clamped. Clause 14: The method of any clause in this paragraph, further comprising: if required, lowering the pallet (140) from the pallet load (124); removing the pallet (140) from the pallet-receiving zone (104); moving a different pallet into the pallet-receiving zone (104); raising the different pallet to the pallet load (124); and deactivating the clamp assembly (106) so that the pallet load (124) is supported by the different pallet. Clause 15: The method of any clause in this paragraph, further wherein: the different pallet has a different pallet load; during the raising of the different pallet, the different pallet load is raised to the pallet load (124); and during the deactivating of the clamp assembly (106), the pallet load (124) is supported on top of the different pallet load on the different pallet.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:
1. An apparatus comprising:
   a pallet-receiving assembly having a frame defining a pallet-receiving zone configured to receive, at least in part, a pallet supporting a pallet load;
   a clamp assembly comprising clamping mechanisms connected to the pallet-receiving assembly and cooperating to define a clamping zone configured to secure a first side, a second side, and a rear of the pallet load once the clamp assembly is activated by a pneumatic circuit so that the pallet load is supported by the clamp assembly, at least one of the clamping mechanisms including first and second extension assemblies connected to a pressure plate and independently actuatable to move in a direction towards and away from the clamping zone to adjust the angle of the pressure plate relative to the clamping zone; and the pneumatic circuit is for controlling a clamping pressure of the pressure plate of the clamp assembly.
2. The apparatus of claim 1, wherein:
   the clamping mechanisms comprising:
   a first-side clamping mechanism attached to a first side of the frame, a second-side clamping mechanism attached to a second side of the frame, and a rear-clamping mechanism attached to a rear of the frame; and the first-side clamping mechanism, the second-side clamping mechanism, and the rear-clamping mechanism are configured to move inwardly towards the clamping-zone once the pneumatic circuit is activated, and the first-side clamping mechanism, the second-side clamping mechanism, and the rear-clamping mechanism secure the pallet load so that the pallet does not support the secured part of the pallet load.

3. The apparatus of claim 2, wherein the first-side clamping mechanism, the second-side clamping mechanism, or both adjusts the angle of the respective pressure plate to match a shape of a pallet load once the first-side clamping mechanism, the second-side clamping mechanism, or both are activated.

4. The apparatus of claim 3, wherein the clamp assembly is configured to secure a single layer of product of the pallet load.

5. The apparatus of claim 4, wherein, the rear-clamping mechanism is configured to have a height of less than 5 to 10 inches.

6. The apparatus of claim 1, further comprising, an air pressure selector switch for selecting between a high pressure and a low pressure for the pneumatic circuit.

7. The apparatus of claim 6, wherein, the high pressure ranges from between 30-60 psi, and the low pressure ranges from between 15-30 psi.

8. The apparatus of claim 1, further comprising a load detector configured to detect whether the pallet load is improperly secured once the clamp assembly is activated and the pallet is separated from the pallet load.

9. The apparatus of claim 1, wherein the first and second extension assemblies are connected to opposing ends of the pressure plate.

10. A method, comprising:
activating a clamp assembly so that a pallet load on a pallet is supported by the clamp assembly, the pallet load in a clamping zone and the pallet in a pallet-receiving zone; and
wherein the clamp assembly includes at least one clamping mechanism having a pressure plate and first and second extension assemblies connected to the pressure plate and independently actuatable to adjust an angle of the pressure plate by advancing a first end of the pressure plate further into the clamping zone than a second end of the pressure plate to secure the pallet load.

11. The method of claim 10, further wherein, the pallet load comprises product with voids, the pallet load is irregularly shaped, or both.

12. The method of claim 11, further comprising:
lowering the pallet from the pallet load;
detecting whether the pallet load is securely clamped.

13. The method claim 12, further comprising:
removing the pallet from the pallet-receiving zone;
moving a different pallet into the pallet-receiving zone;
raising the different pallet to the pallet load; and
deactivating the clamp assembly so that the pallet load is supported by the different pallet.

14. The method of claim 13, further wherein:
the different pallet has a different pallet load;
during the raising of the different pallet, the different pallet load is raised to the pallet load; and
during the deactivating of the clamp assembly, the pallet load is supported on top of the different pallet load on the different pallet.

15. The method of claim 11, further comprising:
lowering the pallet from the pallet load;
removing the pallet from the pallet-receiving zone;
moving a different pallet with a different pallet load into the pallet-receiving zone;
raising the different pallet to the pallet load so that the different pallet load is raised to the pallet load;
deactivating the clamp assembly so that the pallet load is supported on top of the different pallet load on the different pallet.

16. The method of claim 10, wherein the first and second extension assemblies are connected to opposing ends of the pressure plate.

17. An apparatus comprising:
a frame defining a pallet-receiving zone configured to receive, at least in part, a pallet supporting a pallet load having a first side, a second side, and a rear;
clamping mechanisms comprising a first-side clamping mechanism attached to a first side of the frame, a second-side clamping mechanism attached to a second side of the frame, and a rear-clamping mechanism attached to a rear of the frame and cooperating to define a clamping zone,
each of the first-side clamping mechanism and the second-side clamping mechanism including at least one extension assembly connected to a pressure plate, at least one of the extension assemblies being actuated to adjust an angle of the pressure plate to move a first end of the pressure plate in a horizontal direction towards the clamping zone further than a second end of the pressure plate; and
a pneumatic circuit for controlling a clamping pressure of the clamping mechanisms so that the pallet load is supported by the clamping mechanisms, wherein the clamping mechanisms are configured to move inwardly towards the clamping-zone once the pneumatic circuit is activated to secure the pallet load so that the pallet does not support the secured part of the pallet load, wherein the first-side clamping mechanism, the second-side clamping mechanism, or both adjusts the pressure plate angle to match a shape of a pallet load once the first-side clamping mechanism, the second-side clamping mechanism, or both are activated, wherein the first-side clamping mechanism and the second-side clamping mechanism includes.

a front assembly having a front pivot and a front extension assembly;
a rear assembly having rear pivot and rear extension assembly; and
the front assembly and the rear assembly move independently of each other in a horizontal direction towards and away from the clamping zone for adjusting the angle of the pressure plate.

* * * * *